(12) United States Patent
Glaros

(10) Patent No.: US 9,563,582 B2
(45) Date of Patent: Feb. 7, 2017

(54) MODULAR DEVICE, SYSTEM, AND METHOD FOR RECONFIGURABLE DATA DISTRIBUTION

(71) Applicant: SYNEXXUS, INC., Arlington, VA (US)

(72) Inventor: Gregory Emil Glaros, McLean, VA (US)

(73) Assignee: Synexxus, Inc., Arlington, VA (US)

( * ) Notice: Subject to any disclaimer, the term of this patent is extended or adjusted under 35 U.S.C. 154(b) by 0 days.

(21) Appl. No.: 15/015,729

(22) Filed: Feb. 4, 2016

(65) Prior Publication Data

US 2016/0154748 A1 Jun. 2, 2016

Related U.S. Application Data

(63) Continuation-in-part of application No. 14/046,030, filed on Oct. 4, 2013.

(51) Int. Cl.
| | | |
|---|---|---|
| *G06F 3/00* | (2006.01) | |
| *G06F 13/12* | (2006.01) | |
| *G06F 13/38* | (2006.01) | |
| *G06F 13/10* | (2006.01) | |
| *G06F 9/445* | (2006.01) | |

(52) U.S. Cl.
CPC ......... *G06F 13/102* (2013.01); *G06F 9/44505* (2013.01); *G06F 13/10* (2013.01)

(58) Field of Classification Search
CPC ..... G06F 9/44505; G06F 13/10; G06F 13/102
USPC .......................................... 710/8, 67, 72, 73
See application file for complete search history.

(56) References Cited

U.S. PATENT DOCUMENTS

| | | | | |
|---|---|---|---|---|
| 2005/0120079 | A1* | 6/2005 | Anderson | H04L 29/06027 709/203 |
| 2008/0195613 | A1* | 8/2008 | Sumi | G06F 13/4243 |
| 2008/0228968 | A1* | 9/2008 | Aihara | G03G 15/5004 710/66 |
| 2009/0204730 | A1* | 8/2009 | Mochizuki | G06F 9/4446 710/19 |
| 2010/0026802 | A1* | 2/2010 | Titus | G08B 13/19608 348/143 |
| 2012/0113170 | A1* | 5/2012 | Igarashi | G06F 3/14 345/694 |
| 2013/0061271 | A1* | 3/2013 | Lu | H04L 12/2838 725/74 |
| 2013/0082673 | A1* | 4/2013 | Sako | G05F 1/46 323/282 |

* cited by examiner

*Primary Examiner* — Idriss N Alrobaye
*Assistant Examiner* — Getente A Yimer
(74) *Attorney, Agent, or Firm* — Sterne, Kessler, Goldstein & Fox P.L.L.C.

(57) ABSTRACT

Systems, methods, and computer program product embodiments for a reconfigurable system are described herein. An embodiment includes a power supply an integrated controller configured to host a plurality of sensors and a display. The embodiment also includes a video decoder configured to receive a plurality of inputs and route a selected input based on an interaction with the display. Further, the embodiment includes memory devices configured to store the selected input.

19 Claims, 16 Drawing Sheets

MODULAR DEVICE, SYSTEM, AND METHOD FOR RECONFIGURABLE DATA DISTRIBUTION

CROSS-REFERENCE TO RELATED APPLICATION

This patent application is a continuation in-part of U.S. application Ser. No. 14/046,030 filed Oct. 4, 2013, which is herein incorporated by reference in its entirety.

BACKGROUND

Technical Field

The present disclosure relates generally to the integration of various networking functions into a single circuit board for a networked system to enable rapid integration and dynamically modifiable output to display devices.

Background

Specialized vehicles, such as armored vehicles, use comprehensive networked systems to enable the rapid "plug and play" of disparate subsystems within the vehicle. These networked systems seek to provide an "any data, any station" environment in which the data from any sensor associated with the vehicle may be output to any display associated with the vehicle—regardless of whether the different sensors or other inputs use standardized operating platforms or proprietary ones. To implement this functionality, these comprehensive networked systems have cobbled together commercial, off-the-shelf components with a few custom components using custom cabling harnesses.

The cobbling together of commercial components as well as custom components impedes production flow, complicates testing during development, and ultimately hinders the speed in which these comprehensive networked systems can reach the market. The design of the different components, as well as their interconnections, hinders efforts to reduce the physical footprint of the comprehensive networked systems within the vehicles. In addition, these systems have typically used active cooling components that have a lower mean-time-before-failure (MTBF) than solid state components. Accordingly, devices, methods, and systems are needed that overcome limitations with respect to the size, functionality, and speed to market for comprehensive networked systems, as well as other disadvantages.

BRIEF DESCRIPTION OF THE DRAWINGS/FIGURES

Figure 1:
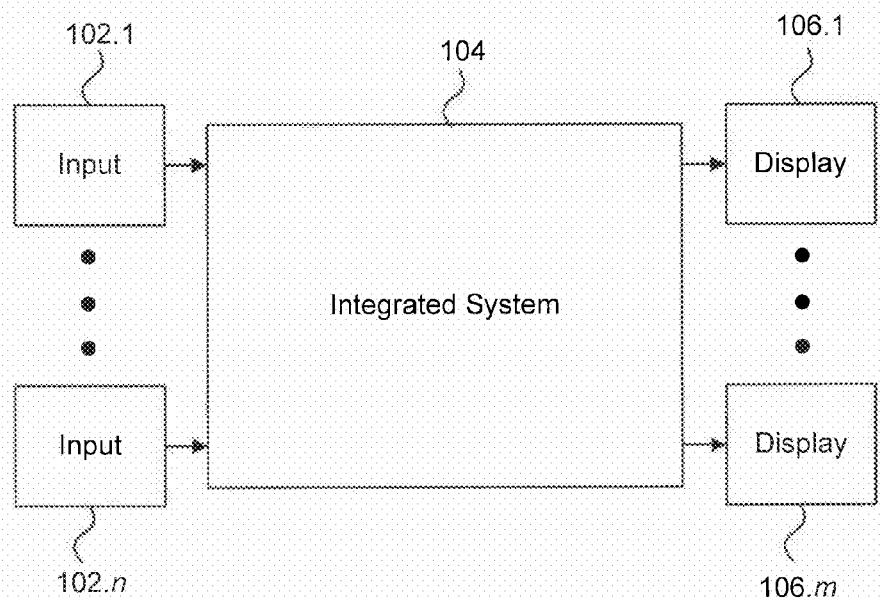
FIG. 1 is a diagram illustrating a modular device in a reconfigurable data distribution system, according to an embodiment.

The features and advantages of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present disclosure is described herein with reference to illustrative embodiments for particular applications, it should be understood that the disclosure is not so limited. Those skilled in the relevant art(s) will recognize additional modifications, applications, and embodiments within the scope thereof and additional fields in which the disclosure would be of significant utility.

System Overview

FIG. 1 illustrates an exemplary reconfigurable data distribution system 100, according to an embodiment. Exemplary reconfigurable data distribution system 100 is provided for the purpose of illustration and is not limiting of embodiments of the present disclosure. In an embodiment, the system 100 may be a version of an Electronic Keel (EKeel)® system. As shown in FIG. 1, system 100 includes a plurality of inputs 102.1 through 102.$n$, integrated system 104, and a plurality of displays 106.1 through 106.$m$. The plurality of inputs 102.1 through 102.$n$ may include temperature sensors, pressure sensors, velocity sensors, data loggers, image sensors, and/or cameras, just to name a few examples.

The inputs 102.1 through 102.$n$ may be mounted on motors or actuators that allow the system to position the inputs 102.1 through 102.$n$ based on prior feedback from data generated by the system or input by a user. The user may be a human. Alternatively, the user may be a computer or software application. In an embodiment, the request may be based on the user's browsing of a particular website, use of a cloud computing service, or some other remote application as will be understood by a person skilled in the relevant art(s). As just one example, inputs 102.1 through 102.$n$ may be mounted externally on an armored vehicle, such as a Mine Resistant Armor Protected (MRAP) vehicle. Other vehicle types relating to land, sea, or air are also within the scope of the present disclosure, as a person skilled in the relevant art(s) would appreciate. The disclosure is also applicable to any environment or application having multiple heterogeneous inputs and outputs. The inputs 102.1 through 102.*n* provide data wirelessly or via wired connections to the integrated system 104.

The inputs 102.1 through 102.*n* provide their collected data to the integrated system 104. For example, the inputs 102.1 through 102.*n* may provide collected data in analog format for processing or routing by the integrated system 104. Alternatively, the collected data may be provided in digital form to the integrated system 104, as will be appreciated by those skilled in the relevant art(s). The integrated system 104 may receive the collected data from any one or more of the inputs 102.1 through 102.*n* as streams of data, regardless of the operational platform of a particular input. As the data is received, if the data is in analog format, the integrated system 104 may convert it into data packets. In an embodiment, the data packets may be created according to the internet protocol, although other protocols may be used instead as will be recognized by those skilled in the relevant art(s).

In an embodiment, the integrated system 104 may be an integrated computer built on a single circuit board, such as a computer-on-module. In one example, the integrated system 104 may be designed based on the COM Express® specification hosted by the PCI Industrial Computer Manufacturers Group, for example the Type 6 specification. The Type 6 specification includes a pin out definition in the COM Express® specification, which may include up to 24 peripheral component interconnect (PCI) express lanes, 1 PCI Express Graphics (PEG) interface, 4 serial advanced technology attachment (SATA) ports, 1 local area network (LAN) port, 8 universal serial bus (USB) 2.0 ports, 4 USB 3.0 ports, and multiple display interfaces including video graphics adapter (VGA), low-voltage differential signaling (LVDS), PEG, and device driver interface (DDI). As will be recognized by those skilled in the relevant art(s), the Type 6 specification is just one example. Embodiments of the present disclosure may be implemented in other ways that incorporate the features onto a single circuit board with a similar form factor and range of capabilities.

The integrated system 104 may include one or more dedicated peripherals integrated on the same single circuit board to ensure computational reliability and enable additional monitoring and control of the overall system 100. The integrated system 104 may also include a dedicated microprocessor built on the same circuit board as the rest of the system. The dedicated microprocessor, such as dedicated microprocessor 210 that will be discussed in more detail below with respect to FIG. 2A, may be responsible for attaching and managing various peripherals to the system 100.

In an embodiment, the plurality of displays 106.1 through 106.*m* may be a plurality of touch screen monitors, or a mixture of touch screen and non-touch capable monitors, just to name a few examples. After receiving the data from the plurality of inputs 102.1 through 102.*n* and performing any necessary or requested processing on the data, the integrated system 104 may route the data, some subset of the data, and/or additional data derived from the received data, to one or more of the plurality of displays 106.1 through 106.*m*. In operation, the system 100 may enable the viewing of any data source, for example any of inputs 102.1 through 102.*n*, at any display 106.1 through 106.*m*. The viewable data may be processed first by the integrated system 104, and/or be displayed as the original data (e.g., analog data) from the inputs 102.1 through 102.*n*.

The integration of the different computational and peripheral elements onto a single circuit board may significantly reduce the size of the overall system 100. Additionally, in an embodiment the system 100's enclosure may be a conformal heat sink design that enables a passively cooled system. In such an embodiment, the use of solid state parts instead of moving parts for cooling may advantageously increase the mean time before failure. Further, the integration of the computational and peripheral elements onto a single circuit board may enhance the production flow, simplify the testing process, and expedite the speed of these devices to market.

Integrated System 104

Figure 2A:
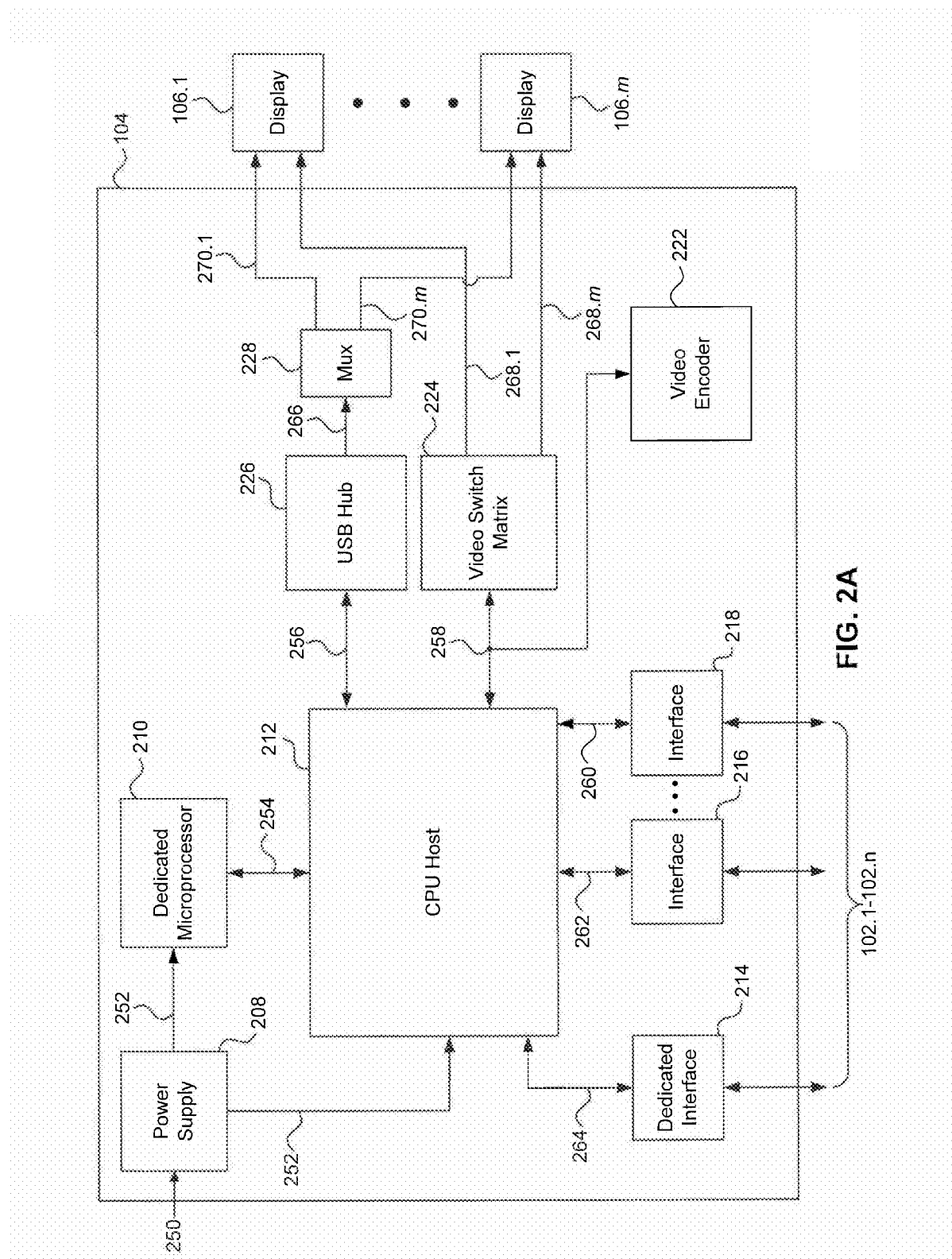
FIG. 2A is a diagram illustrating a modular device, according to an embodiment.

FIG. 2A illustrates a modular device, such as integrated system 104, according to a first embodiment. The integrated system 104 may include a power supply 208, a dedicated microprocessor 210, a central processing unit (CPU) host 212, a dedicated interface 214, a plurality of interfaces 216 through 218, a video encoder 222, a switch matrix 224 and a communication hub 226, and a multiplexer 228. As will be recognized by those skilled in the relevant art(s), embodiments here are described with the aid of functional building blocks illustrating the implementation of specified functions and relationships thereof. The boundaries of these functional building blocks have been arbitrarily defined for the convenience of the description. Alternate boundaries can be defined so long as the specified functions and relationships are appropriately performed.

In FIG. 2A, inputs 102.1 through 102.*n* may send and receive data via interfaces 214, 216, and 218. The dedicated interface 214 may be a USB device dedicated to serial communication. In an embodiment, the dedicated interface 214 may specifically be a FT4232 USB hi-speed integrated circuit, produced by Future Technology Devices International, Ltd. of Glasgow, United Kingdom. Other dedicated circuits may instead be used, as will be understood by those skilled in the relevant art(s). In such an embodiment, the dedicated interface 214 may include a controller area network (CAN) bus-based device, two RS232 serial devices, and at least one COM port to enable communication to the dedicated microprocessor 210. This enables a dedicated, uninterrupted command and control scheme for the integrated system 104. As will be recognized by those skilled in the relevant art(s), the dedicated interface 214 may include more or different interfacing devices as those indicated above.

The CAN bus-based device of dedicated interface 214 may be a dedicated CAN controller that operates at or around 500 Kbits/second, although other speeds may be possible as will be recognized by those skilled in the relevant art(s). The CAN controller may communicate via a CAN data bus, for example a CAN 2.0B specification-compliant data bus. Dedicated software for the CAN data bus, as well as for the dedicated COM port, may allow a full J1939 configurable interface for vehicle applications. In an embodiment, the CAN data bus may be used primarily for vehicle data diagnostics and health monitoring.

The two RS232 serial devices of dedicated interface 214 may enable the attachment of additional serial peripheral devices to the integrated system 104. In an embodiment, the two RS232 serial devices are dedicated to the CPU host 212 via the dedicated interface 214. As will be recognized by those skilled in the relevant art(s), fewer or more than two RS232 serial devices may be implemented.

Interfaces 216 and 218 may represent one or more interfaces to one or more corresponding peripheral devices. Although only two interfaces are shown, a person skilled in the relevant art(s) will recognize that additional or fewer interfaces may be implemented for communication with additional or fewer peripheral devices. Interface 216 may be, for example, an Ethernet switch interface. For simplicity of discussion, reference to interface 216 will be with respect to an Ethernet switch interface 216, although other components may be used instead. The Ethernet switch interface 216 may be integrated on the same circuit board as the other circuits within integrated system 104, such as with the backplane, thereby reducing design costs and constraints. Integration of an Ethernet switch removes the necessity of an external Ethernet switch for networking IP-based devices together to the system 100. The Ethernet switch may support various Ethernet speeds, for example a gigabit speed. Other speeds, both faster and slower, are envisioned as will be recognized by those skilled in the relevant art(s).

Interface 218 may be an interface for any other peripheral device input 102.1 through 102.n that provides a data stream to the integrated system 104, for example temperature sensors, pressure sensors, velocity sensors, data loggers, image sensors, and/or cameras. Interfaces 214, 216, and 218 may communicate with the CPU host 212 via signal paths 264, 262, and 260, respectively. Signal paths 264, 262, and 260 may be single traces or buses.

CPU host 212 is the central component of the integrated system 104 and serves as the primary host for all attached peripherals, whether integrated or external to the integrated system 104. As indicated above, the CPU host 212 may be, for example, implemented according to the motherboard standards in the COM Express specification. In one embodiment, the CPU host 212 may be implemented as a Type 6 COM Express board.

The dedicated microprocessor 210 may be responsible for attaching and managing various peripherals to the system 100. In an embodiment, the dedicated microprocessor 210 may manage the programming of the low-level circuitry of the integrated system 104. The dedicated microprocessor 210 may serve as the gateway for enabling two or more integrated systems 104 to connect and share information, for example across a Xlink interface as will be discussed in more detail below with respect to FIGS. 2B and 3. The dedicated microprocessor 210 may send and receive messages with the CPU host 212 via data bus 254.

In an embodiment, the dedicated microprocessor 210 may be based on a Microprocessor without Interlocked Pipeline Stages (MIPS) architecture and programmable using the C programming language. Additionally or alternatively, the dedicated microprocessor 210 may be a specific, non-time-dependent state machine that is deterministic. The code which the dedicated microprocessor 210 executes may, for example, run and execute from a boot loader. This enables expandability when deployed in the field without requiring physical programming.

The CPU host 212 may output data for display at one or more of the plurality of displays 106.1 through 106.m via one or more of communication hub 226 and switch matrix 224. For sake of simplicity, this discussion will refer to communication hub 226 as USB hub 226 and switch matrix 224 as video switch matrix 224. As will be understood by those skilled in the relevant art(s), other types of hubs and matrixes are possible. The USB hub 226 may communicate with the CPU host 212 via USB bus 256. The USB bus 256 may enable the dedicated microprocessor 210 to attach additional USB input devices or output devices to the CPU host 212, depending on how user or situational requirements change over time. In an embodiment, the USB hub 226 may output data to one or more of the plurality of displays 106.1 through 106.m via a multiplexer 228, which receives data signal 266 from the USB hub 226 and outputs USB output signals over the data bus 270.1 through 270.m to one or more of the displays.

Any USB input may be output to any display 106.1 through 106.m. In an example, the data input from any input from among inputs 102.1 through 102.n may be routed to any display 106.1 through 106.m. The data input is not necessarily only video data. According to embodiments of the present disclosure, any data input may be routed to any data output. In one example, that input may be video data. The input may additionally or alternatively be radar data, LIDAR data, radio data, etc.

The video switch matrix 224 may communicate with the CPU host 212 via video bus 258. The video switch matrix 224 may be a bus matrix that enables the implementation and display of video sources and routing of analog video sources. In an embodiment, the video switch matrix 224 may enable the implementation and display of VGA sources, for example 3 sources. More or fewer sources are possible, as will be recognized by those skilled in the relevant art(s). These sources may be the CPU processor of the CPU host 212, another integrated system 104 discussed with respect to FIG. 2B below, and another that has been ported out to a MIL-Circ header used for displaying of an external source. Using the video switch matrix 224, any video input may be output to any of the plurality of displays 106.1 through 106.m. The video switch matrix 224 determines what to output to each display 106.1 through 106.m. In an embodiment, the video switch matrix 224 is fully digital and integrated, cycling millions of times a second to enable each display to be reconfigurable on-the-fly.

The video bus 258 may be programmable and adjustable. In an embodiment, the video bus 258 may be a keyboard-video-mouse (KVM) style bus. The keyboard and mouse devices may be additional peripherals that may be controlled by the CPU host 212 and/or the dedicated microprocessor 210, as discussed above.

The video switch matrix 224 may also enable the routing of data from a plurality of analog video sources to a plurality of analog outputs, such as one or more of the displays 106.1 through 106.m. In one embodiment, the integrated system 104 may receive up to four analog video inputs, for example as a subset of the plurality of inputs 102.1 through 102.n. As will be recognized by those skilled in the relevant art(s), the integrated system 104 may be capable of receiving more video inputs. As will be discussed with respect to FIG. 2B below, two or more integrated systems 104 may be attached together via one or more data paths, enabling the attachment of additional video sources, such as analog video inputs, for routing to the plurality of displays 106.1 through 106.m.

In an embodiment, the video bus 258 may also route the plurality of analog video inputs to the video encoder 222. The video encoder 222 may be any type of video server that is capable of capturing analog video data and converting the analog signal(s) into digital video streams. The video encoder 222 may be attached to the CPU host 212 and be PCI or PCIe-based. Once analog video data is captured by the video encoder 222, it may be shared digitally throughout the system 100, for example using IP, and displayed on computer monitors instead of only analog monitors via the video switch matrix 224. The video encoder 222 may include one or more analog video inputs, for example received from the video bus 258. In an embodiment, the video encoder 222 may be able to receive up to 4 analog video signals for conversion into digital video streams, although more signals may be converted as will be recognized by those skilled in the relevant art(s).

The video encoder 222 may also include a dedicated processor for encoding analog video data based on a compression format, and for performing video analysis. Alternatively or in addition, some or all of the processing may occur at the CPU host 212 and/or the dedicated microprocessor 210. The video encoder 222 may detect and process various analog formats, including the national television system committee (NTSC) and phase alternating line (PAL) formats. As will be recognized by those skilled in the relevant art(s), other video signal formats may also be used.

The video encoder 222 may also include a dedicated memory for storing the device's operating instructions and for buffering purposes. The video encoder 222 may also include its own dedicated input and output interfaces, for example a dedicated Ethernet port for sending and receiving digital data and/or an RS232 port to assist in controlling the functionality of one or more analog video sources. Additionally or alternatively, the video encoder 222 may use the interfaces 214, 216, and 218 to communicate with one or more of the plurality of inputs 102.1 through 102.*n*.

In an embodiment, the video bus 258 includes both the VGA and analog video data. In an alternative embodiment, the video bus 258 may be composed of two distinct busses for each of the VGA and analog data respectively.

The power supply 208 may supply the different power needs of all of the devices integrated with integrated system 104. The power supply 208 may receive power input 250, for example from a MIL-STD power interface provided in military vehicles. As will be recognized those skilled in the relevant art(s), the power supply 208 may receive power input 250 from other sources in addition to, or instead of, a MIL-STD power interface in a military vehicle. The power supply 208 will be addressed in more detail below with respect to FIG. 3.

The different components integrated on the same circuit board in integrated system 104 have very short signal paths to each other and particularly to the CPU host 212, which results in a reduction of information loss. The integrated system 104 overall has a small form factor. For example, the integrated system 104 may have a width (x-dimension) of less than 10 inches, such as 9.25 inches, as well as a length (y-dimension) of around 6 inches, and depth (z-dimension) of less than 1 inch, such as 0.093 inches. In one embodiment, the integrated system may have 12 total layers. These are examples only, and one skilled in the relevant art(s) would recognize that other dimensions and combinations are possible without departing from the scope of the present disclosure.

Figure 2B:
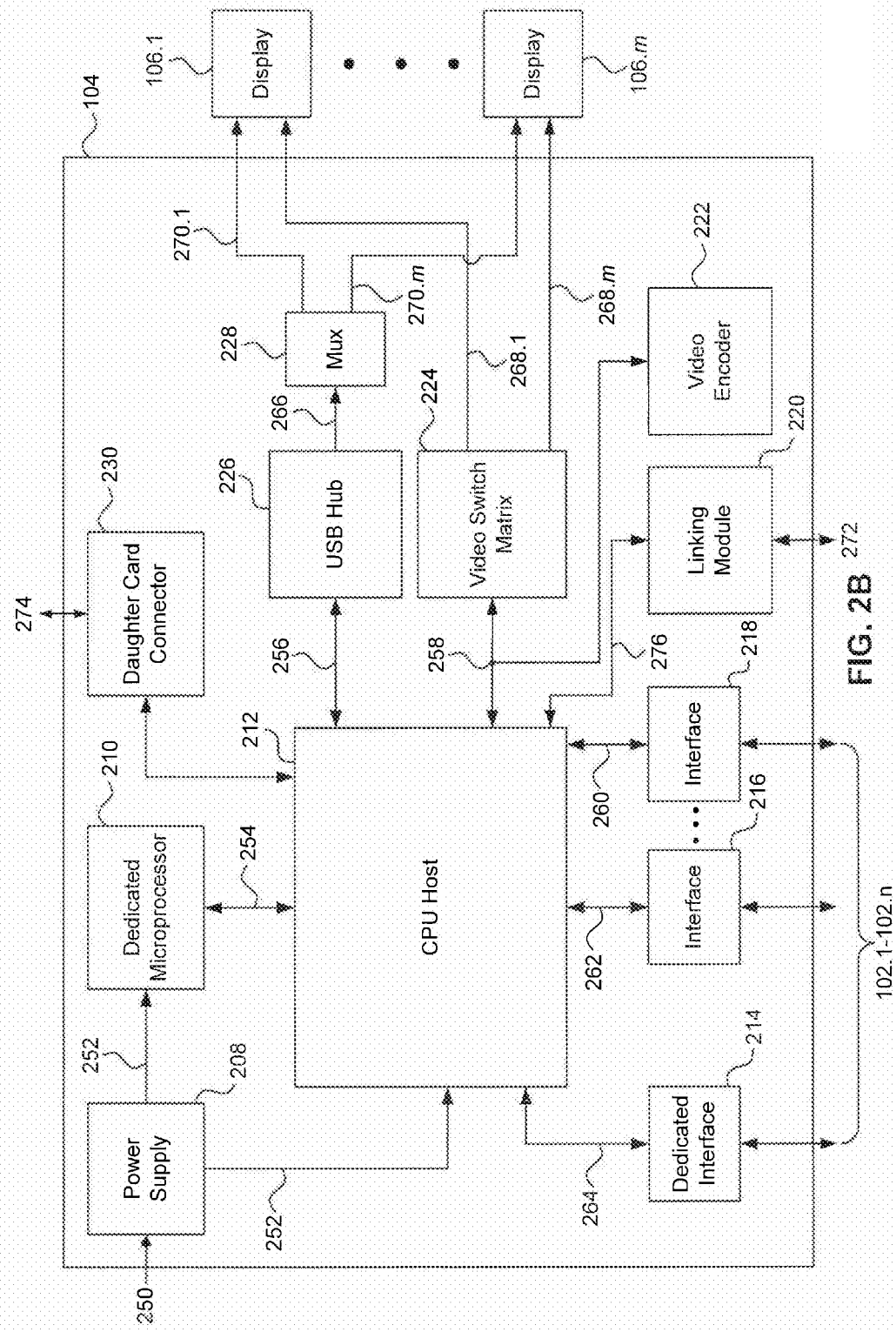
FIG. 2B is a diagram illustrating a modular device, according to another embodiment.

FIG. 2B illustrates a modular device, such as integrated system 104, according to a second embodiment. For sake of simplicity, only those elements that are different from the elements discussed above with respect to FIG. 2A will be addressed. The integrated system 104 of FIG. 2B additionally includes a linking module 220 and a daughter card connector 230.

The linking module 220 may be, for example, an XLink that enables the connecting of two or more integrated systems 104. In an embodiment, the dedicated microprocessors 210 of two integrated systems 104 may share information via the linking module 220. The data from inputs to one integrated system 104 may be routed as connection signal 272 via the linking module 220 to the second integrated system 104 for output at a display connected to the second integrated system, and vice versa. In one example, that data may be analog video data, VGA video data, or data from other video or non-video inputs from among the plurality of inputs 102.1 through 102.*n*.

In further support of the linking module 220's interface, an Ethernet cable may be attached to the Ethernet switch interface 216 for added bandwidth data sharing between the first integrated system 104 and the second integrated system 104. In embodiments where there are multiple integrated systems 104 connected, for example via linking module 220, the second integrated system 104 may operate to attach one or more peripherals to the first integrated system 104, and vice versa.

Daughter card connector 230 may provide an interface for the integrated system 104 to enable attachment of a daughter card to the integrated system 104 to further improve upon the system 100's dimensions and form factor. In an embodiment, the daughter card connector 230 may enable additional peripheral device(s) to connect via a daughter card so that the additional peripheral device(s) are parallel to the integrated system 104's circuit board, rather than perpendicular.

Power Supply

Figure 3:
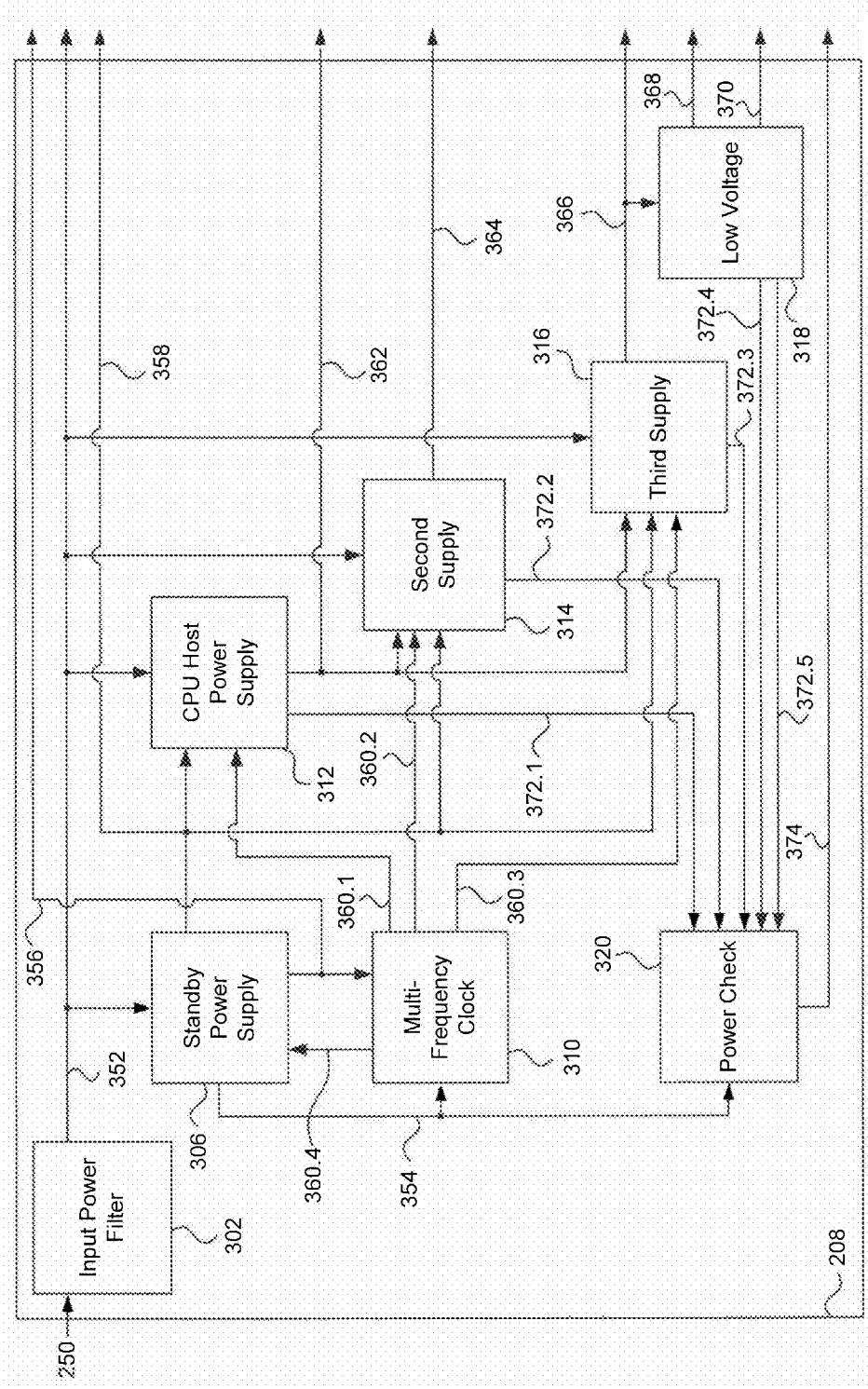
FIG. 3 is a diagram illustrating a power supply of an exemplary modular device, according to an exemplary embodiment.

FIG. 3 provides a diagram illustrating the power supply 208 of an exemplary integrated system 104 according to an exemplary embodiment. The power supply 208 may be a power system customized from the Advanced Technology eXtended (ATX) specification. The power supply 208 may be able to continuously operate off of a range of voltage input values, for example ranging from a 6.5V to a 42V power input 250 and output the standard voltages of 12V, 5V, 3.3V, −5V, and standby 5V and 3.3V. Power input 250, for example from a MIL-STD power interface, may first be filtered by input power filter 302. In an embodiment, input power filter 302 may include a common mode filter that provides noise reduction as well as immunity to the changing power-noise environments in which the integrated system 104 may be found. A first input voltage 352 may be routed to multiple voltage supply circuits, for example a standby power supply 306, CPU host power supply 312, a second supply 314, and a third supply 316.

The standby power supply 306 may receive the first input voltage 352 and output, in response, a first standby voltage 356, a second standby voltage 358, and a standby-good signal 354. In an embodiment, the standby power supply 306 may also be connected to a switch circuit (not shown) that may control a run signal in the standby power supply 306. When the switch circuit is short circuited, or "on," it may pull the run signal above a minimum voltage, for example 1.2V. When the switch circuit is "off," the run signal may be at ground. This is reflected in the standby voltages 356 and 358, as will be addressed below. In an embodiment, the first standby voltage may be 3.3V and the second standby voltage 358 may be 5V. Although other voltage values are possible, as will be recognized by one skilled in the relevant art(s), these particular voltage values will be used for sake of simplicity in this discussion. The 5V standby voltage 358 may be output to the rest of the integrated system 104, as well as input into each of the other power supplies 312, 314, and 316, and the power check circuit 320. The 3.3V standby voltage 356 may be output to the rest of the integrated system 104 and input into the power check circuit 320 and the multi-frequency clock 310.

The multi-frequency clock 310 may receive as inputs the 3.3V standby voltage 356 and the standby-good signal 354. The multi-frequency clock 310 is designed to provide multiple clock signals, at the same or different frequencies, to the other circuits within the power supply 208. As will be recognized by those skilled in the relevant art(s), there are many ways to implement the multi-frequency clock 310 which fall within the scope of this disclosure. In an embodiment, the multi-frequency clock 310 outputs clock signals 360.1 through 360.4, although any other number may be output as is understood. The clock signal 360.1 may be output to the CPU host power supply 312. The clock signal 360.2 may be output to the second supply 314, and the clock signal 360.3 may be output to the third supply 316. The clock signal 360.4 may be output to the standby power supply 306. The multi-frequency clock 310 may also provide synchronization, for example to reduce jitter in the clock signals 360.1 through 360.4.

The CPU host power supply 312 may receive as inputs the first voltage input 352, the 5V standby voltage 358, and the clock signal 360.1. The 5V standby voltage 358 may operate as an on/off signal for the CPU host power supply 312, for example corresponding to when the run signal is "on" and "off." The CPU host power supply 312 may provide a first output power voltage 362. The first output power voltage 362 is output to the integrated system 104 for use by other circuits, components, and peripherals, as well as fed to the second supply 314 and the third supply 316. In an embodiment, the first output power voltage 362 may be a 12V power signal, in accordance with the ATX specification. The CPU host power supply 312 may also output a CPU host power supply good signal 372.1 to the power check circuit 320.

The second supply 314 may receive as inputs the first voltage 352, the 5V standby voltage 358, the clock signal 360.2, and the first output power voltage 362. The 5V standby voltage 358 may also operate as an on/off signal for the second supply 314. The second supply 314 may provide a second output power voltage 364, which is output to the integrated system 104 for use by other circuits, components, and peripherals. In an embodiment, the second output power voltage 364 may be a 5V power signal, in accordance with the ATX specification. The second supply 314 may also output a second supply good signal 372.2 to the power check circuit 320.

The third supply 316 may receive as inputs the first voltage 352, the 5V standby voltage 358, the clock signal 360.3, and the first output power voltage 362. The 5V standby voltage 358 may also operate as an on/off signal for the third supply 316. The third supply 316 may provide a third output power voltage 366, which is output to the integrated system 104 for use by other circuits, components, and peripherals, as well as by the low voltage supply 318. In an embodiment, the third output power voltage 366 may be a 3.3V power signal, in accordance with the ATX specification. The third supply 316 may also output a third supply good signal 372.3 to the power check circuit 320.

The low voltage supply 318 may receive as input the third output power voltage 366. The low voltage supply 318 may provide the power system support required by different dedicated peripherals in the integrated system 104, for example Ethernet switch interface 216 of FIGS. 2A and 2B. The low voltage supply 318 may output first low voltage 368 and second low voltage 370 to the integrated system 104 for use by the circuits, components, and/or peripherals that require low voltage support. The low voltage supply 318 may also output a fourth supply good signal 372.4 and a fifth supply good signal 372.5 to the power check circuit 320.

The power check circuit 320 may receive as inputs the 3.3V standby voltage 356, the standby-good signal 354, the CPU host power supply good signal 372.1, the second supply good signal 372.2, third supply good signal 372.3, and fourth and fifth supply good signals 372.4 and 372.5. The power check circuit 320 determines whether the outputs of the different supplies within power supply 208 are stable and adequate for use outside of the power supply 208.

In operation, the power supply 208 may continuously operate off of a range of voltage input values, for example ranging from a 6.5V to a 42V power input 250 and output the standard voltages of 12V, 5V, 3.3V, −5V, and standby 5V and 3.3V according to the ATX specification.

Scaled System 400

Figure 4:
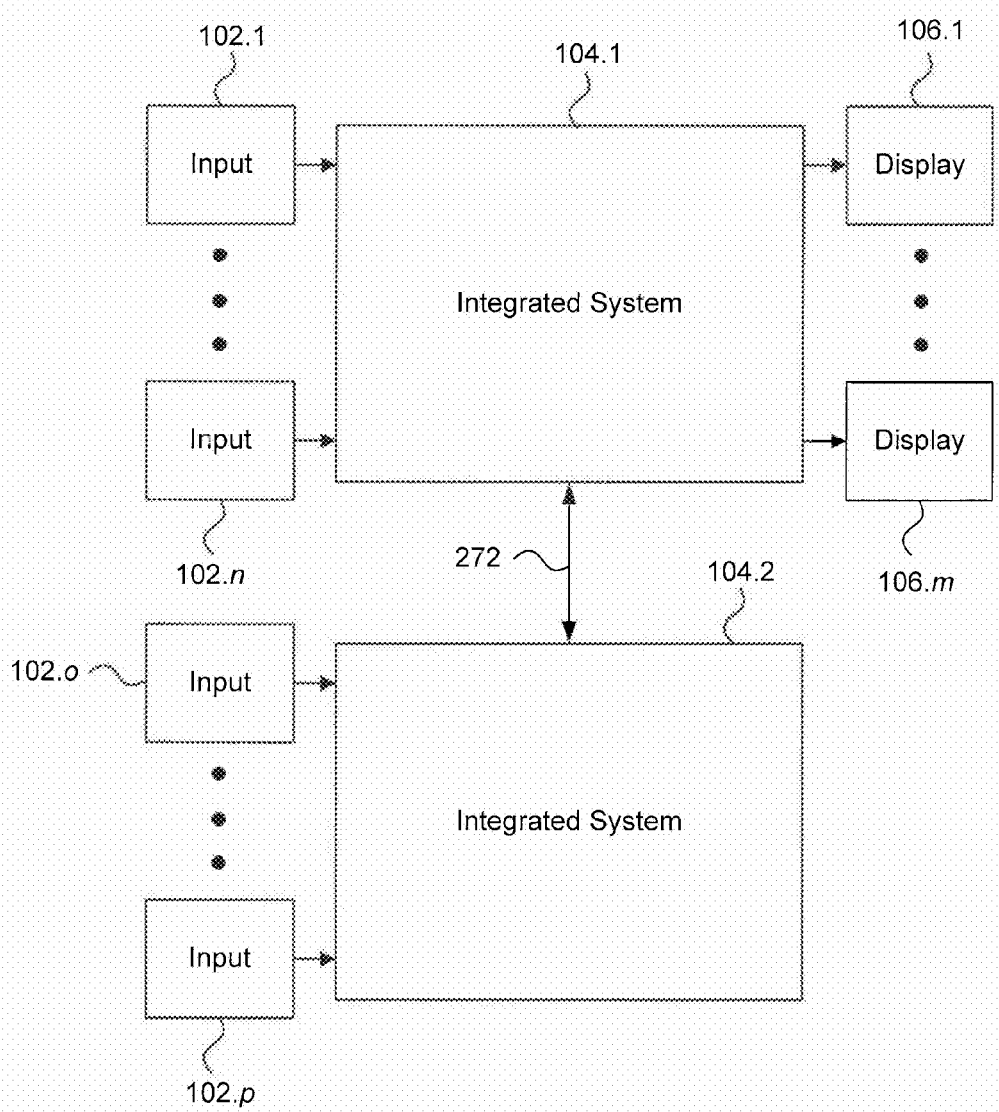
FIG. 4 is a diagram illustrating multiple modular devices in a reconfigurable data distribution system, according to an exemplary embodiment.

In FIG. 4, multiple integrated system environment 400 is illustrated, according to an exemplary embodiment. For purposes of discussion, only those elements that differ, or are in addition to, the elements discussed above with respect to FIGS. 2A and 2B will be addressed. Multiple integrated systems 104.1 and 104.2 are shown in FIG. 4, connected together using connection signal 272 which may be a cable or wireless connection, for example. Although two integrated systems 104.1 through 104.2 are shown in FIG. 4, those skilled in the relevant art(s) will recognize more than two may be combined to increase the functionality of the overall multiple integrated system environment 400. The environment 400 may still include the plurality of inputs 102.1 through 102.$n$, and plurality of displays 106.1 through 106.$m$.

In an embodiment, the plurality of inputs 102.1 through 102.$n$ are a first plurality of inputs attached to the first integrated system 104.1. A second plurality of inputs 102.$o$ through 102.$p$ may be attached to the second integrated system 104.2. This situation may arise, for example, where there are more inputs than a single integrated system 104 may receive, or where additional processing power is desired. Any from the first plurality of inputs 102.1 through 102.$n$ and the second plurality of inputs 102.$o$ through 102.$p$ may be output to any of the displays 106.1 through 106.$m$. Although shown in FIG. 4 as being attached to only integrated system 104.1, there may be additional displays attached to integrated system 104.2, and any input may still be output to any display attached to either integrated system.

The combination of multiple integrated systems 104 may significantly improve processing performance while still maintaining a small form factor. Additionally, in an embodiment the integrated systems 104.1 and 104.2 in environment 400 may be enclosed in a conformal heat sink design that enables passive cooling. The integration of the computational and peripheral elements onto a single circuit board in each integrated system 104.1 and 104.2 may enhance the production flow, simplify the testing process, and expedite the speed of these devices to market, as well as add scalability and bandwidth by the combination of multiple integrated systems.

Exemplary Methods

Figure 5:
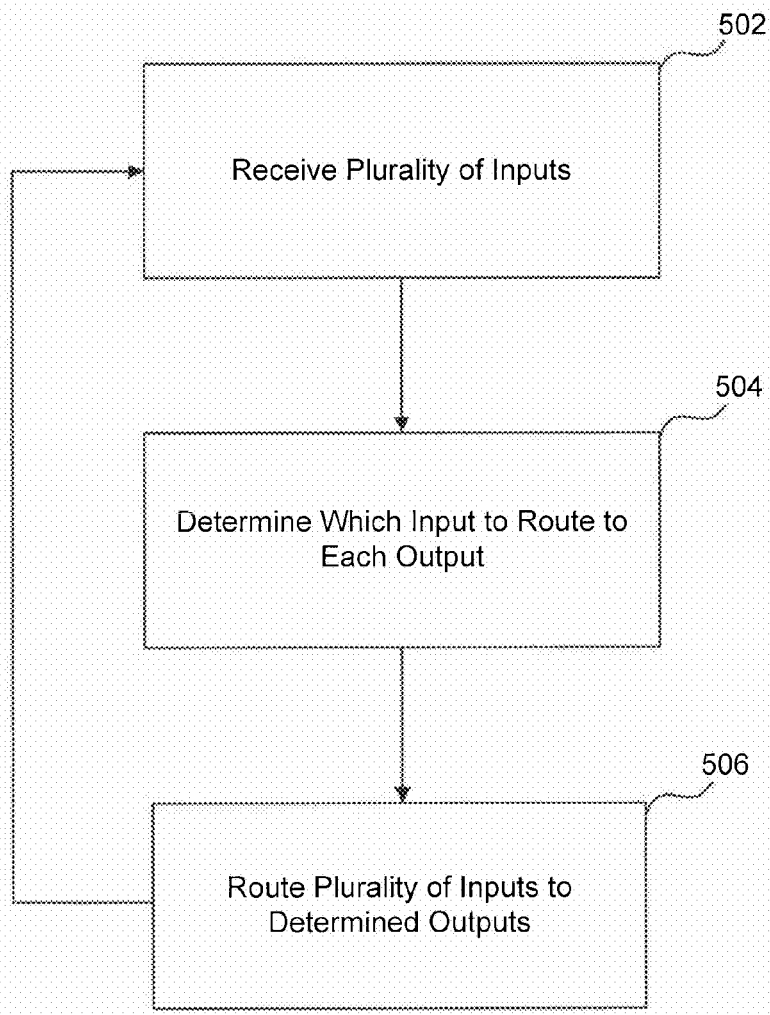
FIG. 5 is a flowchart illustrating an operation of a video switch matrix, according to an embodiment.

FIG. 5 illustrates a flowchart of method 500, an operation of a video switch matrix, according to an embodiment. For example, the video switch matrix may be video switch matrix 224 of FIGS. 2A and 2B above.

At step 502, the video switch matrix 224 receives a plurality of inputs, for example from inputs 102.1 through 102.$n$. The plurality of inputs 102.1 through 102.$n$ may be routed to the video switch matrix 224 via the video bus 258, as discussed above.

At step 504, the video switch matrix 224 determines which input from among the plurality of inputs 102.1 through 102.$n$ to route to which of the displays 106.1 through 106.$m$. The video switch matrix 224 may be reprogrammed many times in a short period of time, for example millions of times in a given second, to enable on-the-fly reconfigurable capabilities to the displays 106.1 through 106.$m$. As a result, each display 106.1 through 106.$m$ may, from the point of view of a user, immediately change what is displayed based on the constant reprogramming within the video switch matrix 224.

At step 506, the inputs are output to one or more of the displays 106.1 through 106.*m* via video output signals 268.1 through 268.*m*. As a result, any input to the integrated system 104 may be output to any display.

Figure 6:
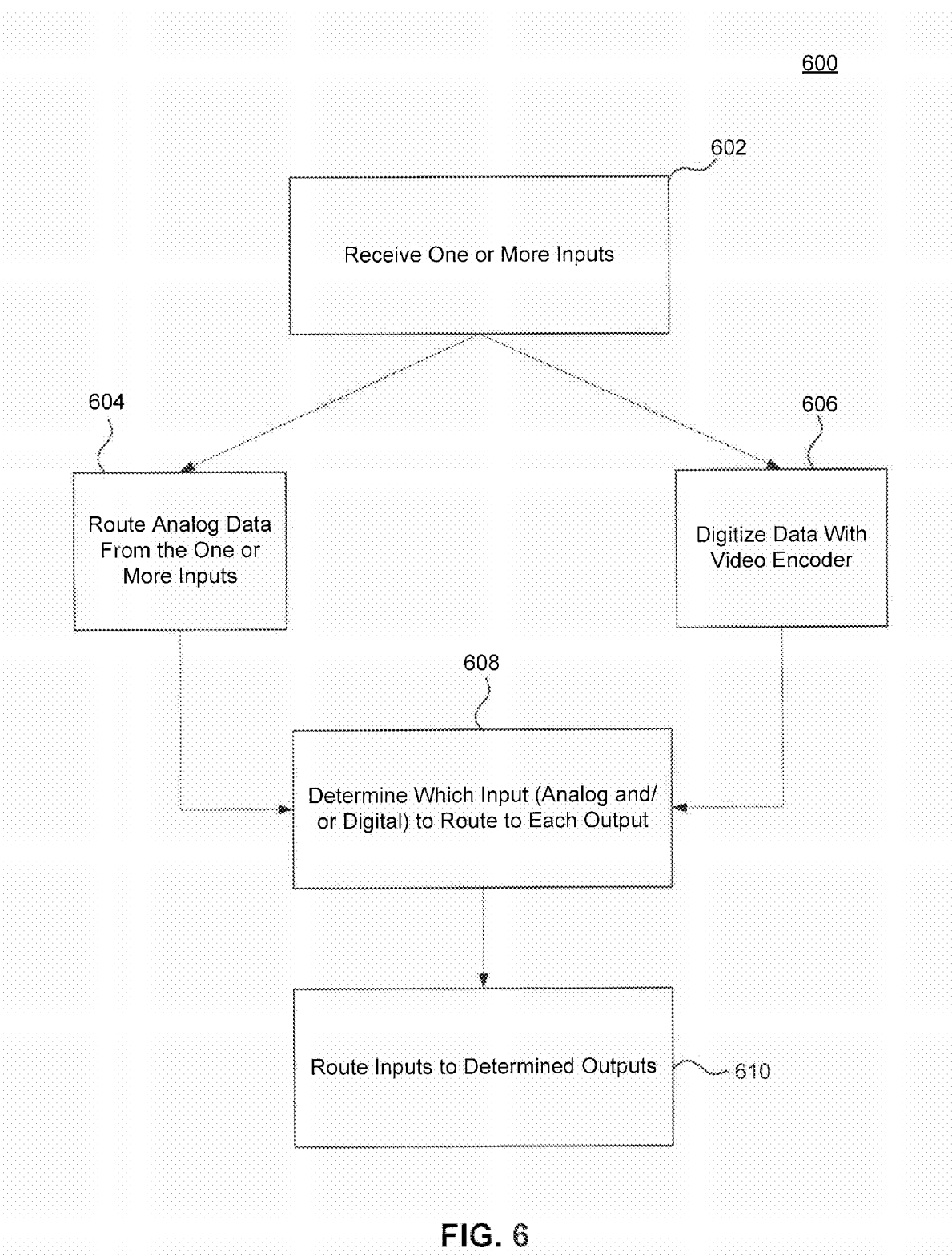
FIG. 6 is a flowchart illustrating an operation of a modular device, according to an embodiment.

FIG. 6 is a flowchart illustrating an operational flow 600 of a modular device, such as integrated system 104, according to a first embodiment.

At step 602, the integrated system 104 receives a plurality of inputs, for example from inputs 102.1 through 102.*n* that have been attached to the integrated system 104.

When the integrated system 104 receives data inputs, the integrated system 104 routes the data internally either in its native format or in a digitized format, for example after conversion by the video encoder 222. This is depicted in steps 604 and 606. At step 604, after the microprocessor 210 has managed the attachment of the peripheral providing the data input, the data may be routed internally in its native format, for example when the data input is an analog video source. If instead the data is to be converted, it is routed to the video encoder 222 and digitized at step 606.

At step 608, whether the integrated system 104 is routing analog or digital data corresponding to the inputs 102.1 through 102.*n*, the video switch matrix 224 determines which input to route to which display 106.1 through 106.*m* when the data is video data, as discussed above with respect to FIG. 5. The USB hub 226 determines which USB input to route to which display 106.1 through 106.*m* as well.

At step 610, the inputs 102.1 through 102.*n* are output to one or more of the displays 106.1 through 106.*m*. In this manner, any input may be output to any display and be reconfigurable on-the-fly.

Exemplary Vehicular Embodiments

Figure 7:
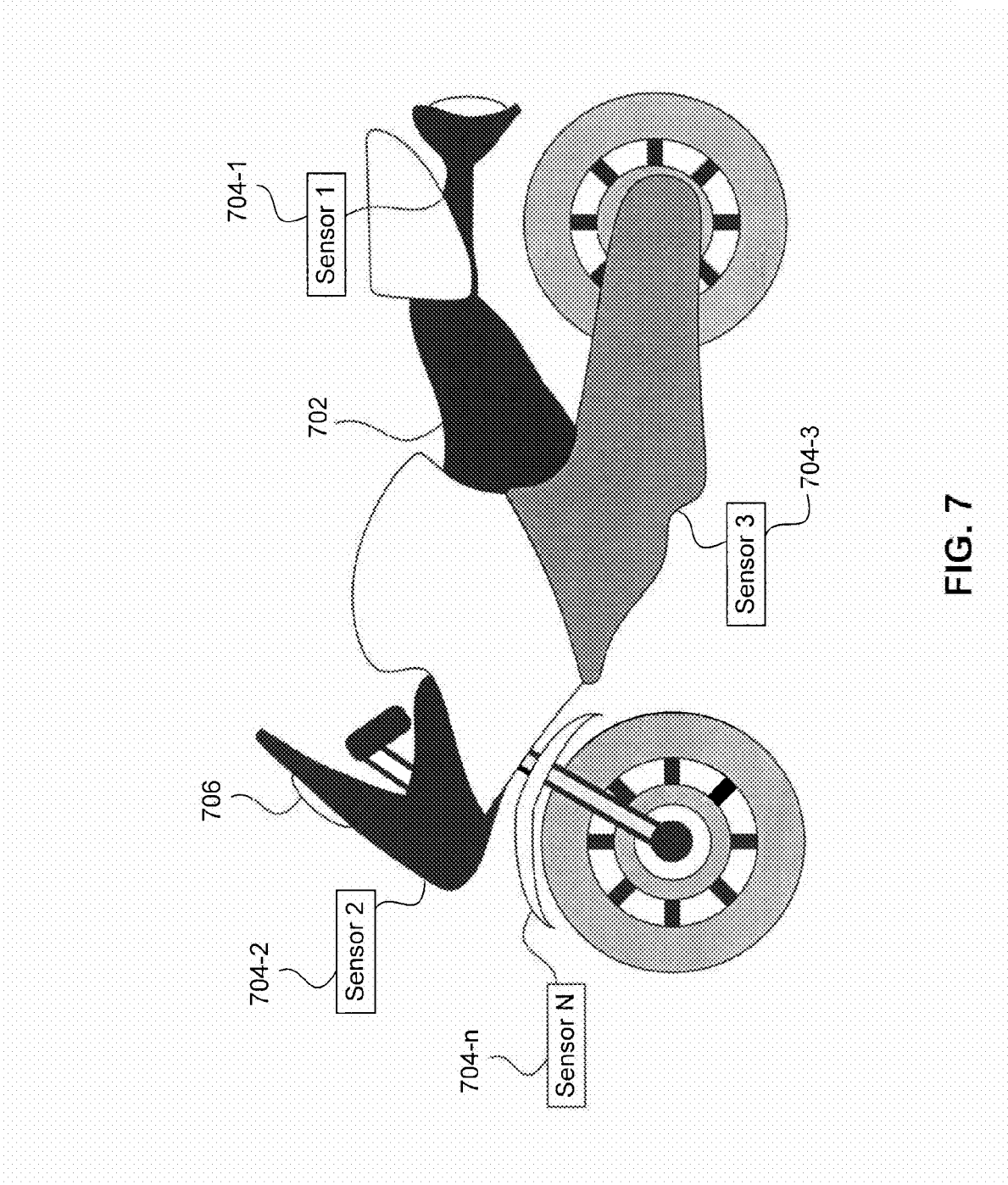
FIG. 7 is a diagram illustrating a reconfigurable data distribution system in a particular vehicle, according to an embodiment.

FIG. 7 illustrates an exemplary embodiment of a reconfigurable data distribution system in a particular vehicle, according to an embodiment. FIG. 7 shows an example of the particular vehicle being a motorcycle. However, the motorcycle is provided for the purpose of illustration and is not limiting of embodiments of the present disclosure. In embodiments, the particular vehicle may be a car, a bus, a bicycle, a boat, an airplane, or any other vehicle configured with a display to show the output of multiple sensors connected to the vehicle.

As shown in FIG. 7, system 700 includes a motorcycle 702, a plurality of inputs 704.1 through 704.*n*, and a display 706. The plurality of inputs may include engine sensors, tire pressure sensors, transmission sensors, electrical system sensors, front facing camera, rear facing camera, Bluetooth sensors, and/or Wi-Fi sensors, just to name a few examples. According to example embodiments, the display 706 may include a Liquid Crystal Display (LCD) screen, a retina display screen, a Light Emitting Diode (LED) screen, a plasma display, or any other type of display. The screen of display 706 may include a resistive display, a capacitive display, a tactile display, or any other type of touch screen to allow the user to interact with the displayed data and receive visual and/or haptic feedback, according to an embodiment.

The sensors 704.1 through 704.*n* may be mounted externally or internally on a vehicle such as the motorcycle 702, according to an embodiment. Specifically, sensors 704.1 through 704.*n* may be mounted on the frame of the motorcycle 702, within the motorcycle 702's engine and transmission, and/or within the motorcycle 702's tires, according to example embodiments. These external and internal sensors may directly connect to a processing system of the motorcycle 702, according to an embodiment. The processing system may intelligently route the external and/or internal sensors data to a display 706 of the motorcycle 702, according to an embodiment. For example, the processing system may route engine specific data to the display gauge of the motorcycle 702. This routing is further explained below.

Figure 8A:
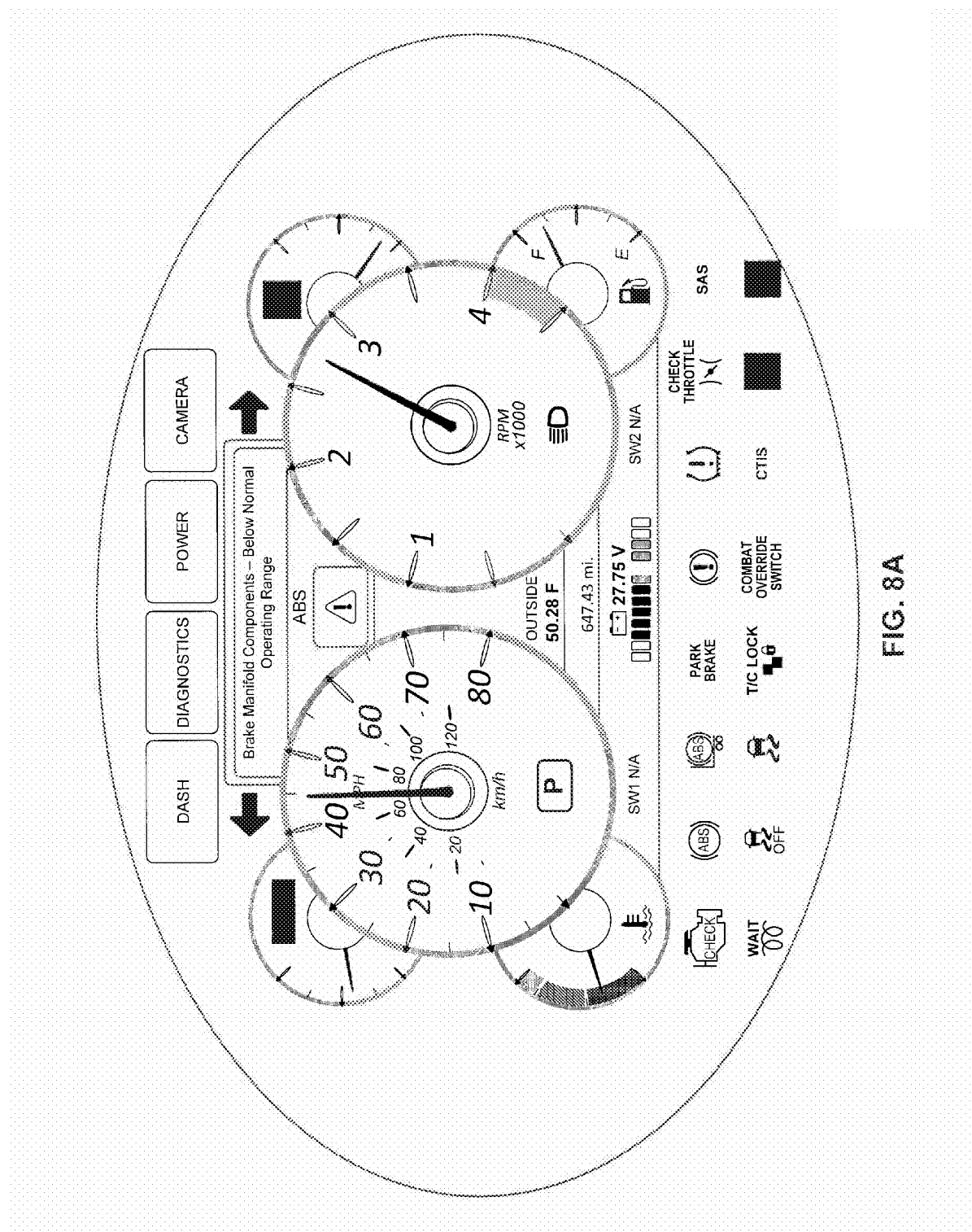
FIGS. 8A-8C are exemplary screenshots illustrating example outputs from a modular device on a singular display device, according to embodiments.

FIG. 8A is an exemplary screenshot illustrating data from a plurality of sensors 704.1 through 704.*n* on a display 706, according to an embodiment. FIG. 8A may be used in a single display in a vehicle such as but not limited to a car, motorcycle, train, and or airplane, according to example embodiments. The plurality of outputs shown in FIG. 8A include outputs from the brake manifold components, speed sensors, battery voltage sensor and a gas sensor, to name a few. In an embodiment, FIG. 8A displays the data outputs from the plurality of sensors 704.1 through 704.*n* adjacent to each other, in a manner that allows a user to view multiple (or all) sensor outputs simultaneously. In an alternative embodiment, the display 706 may place data outputs from the plurality of sensors 704.1 through 704.*n* on top of one another in a transparent manner.

Figure 8B:
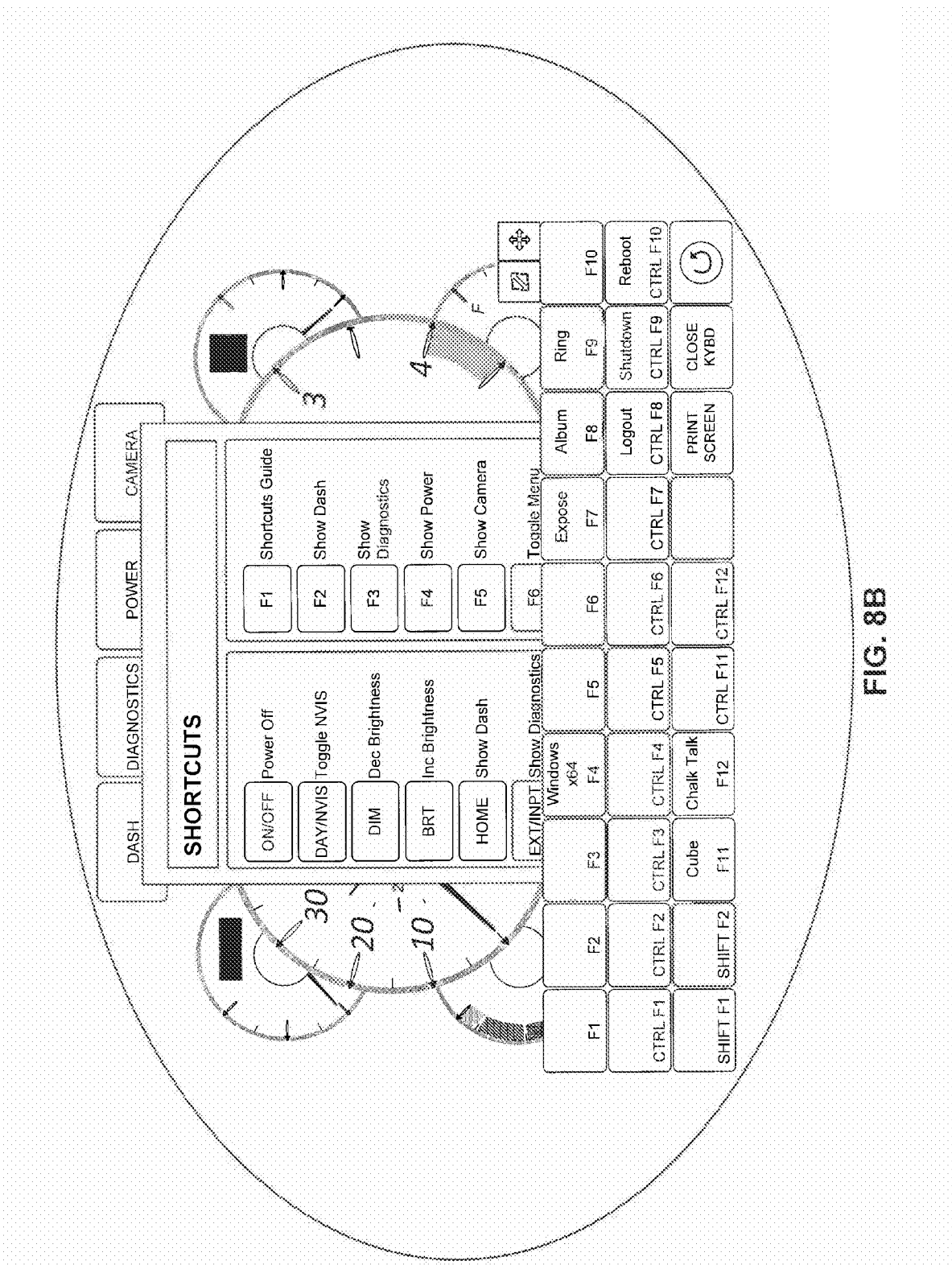
Figure 8C:
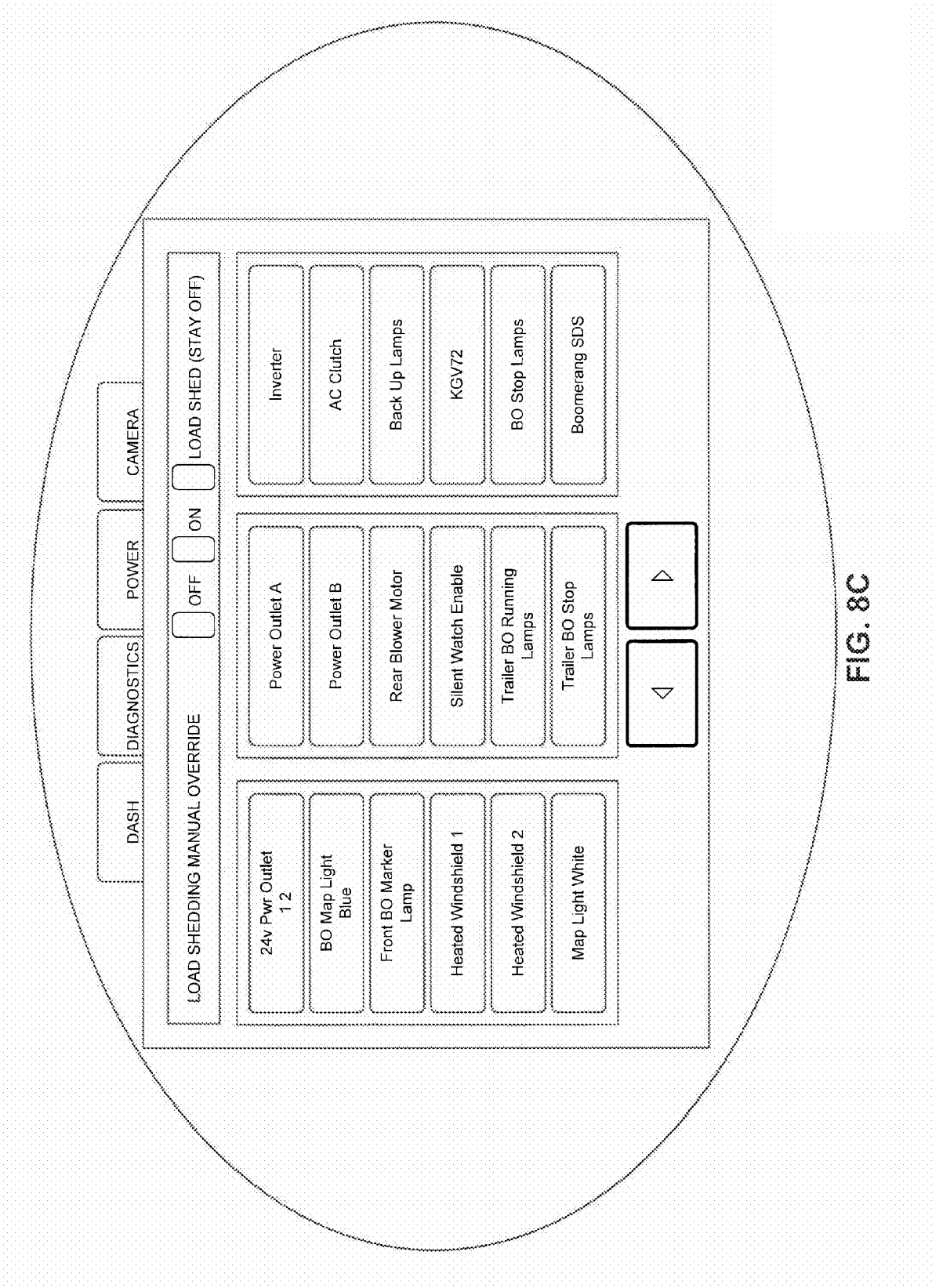

FIGS. 8B and 8C are also exemplary screenshots illustrating outputs from a plurality of sensors 704.1 through 704.*n* on a display 706, according to an embodiment. In FIGS. 8B and 8C, a user can select different settings to display from the output of the plurality of sensors 704.1 through 704.*n* by pressing on the touch screen display 706, according to an embodiment. In an alternative embodiment, the user can select different settings to display from the output of the plurality of sensors 704.1 through 704.*n* by pressing on external buttons configured to communicate with display 706. For example, a user may use a keyboard, select external buttons on a steering wheel, or select buttons on handle bars to select the different settings. The outputs selected in FIGS. 8B and 8C will appear on FIG. 8A in a real-time fashion, according to an embodiment. In a further embodiment, the display 706 may allow the user to resize the outputs and reconfigure the outputs in real time. For example, the user may resize the speedometer by touching on the display 706 and expanding or shrinking the speedometer to a desired size. Any changes made to the selected outputs will automatically update in real time and display in FIG. 8A.

Figure 9:
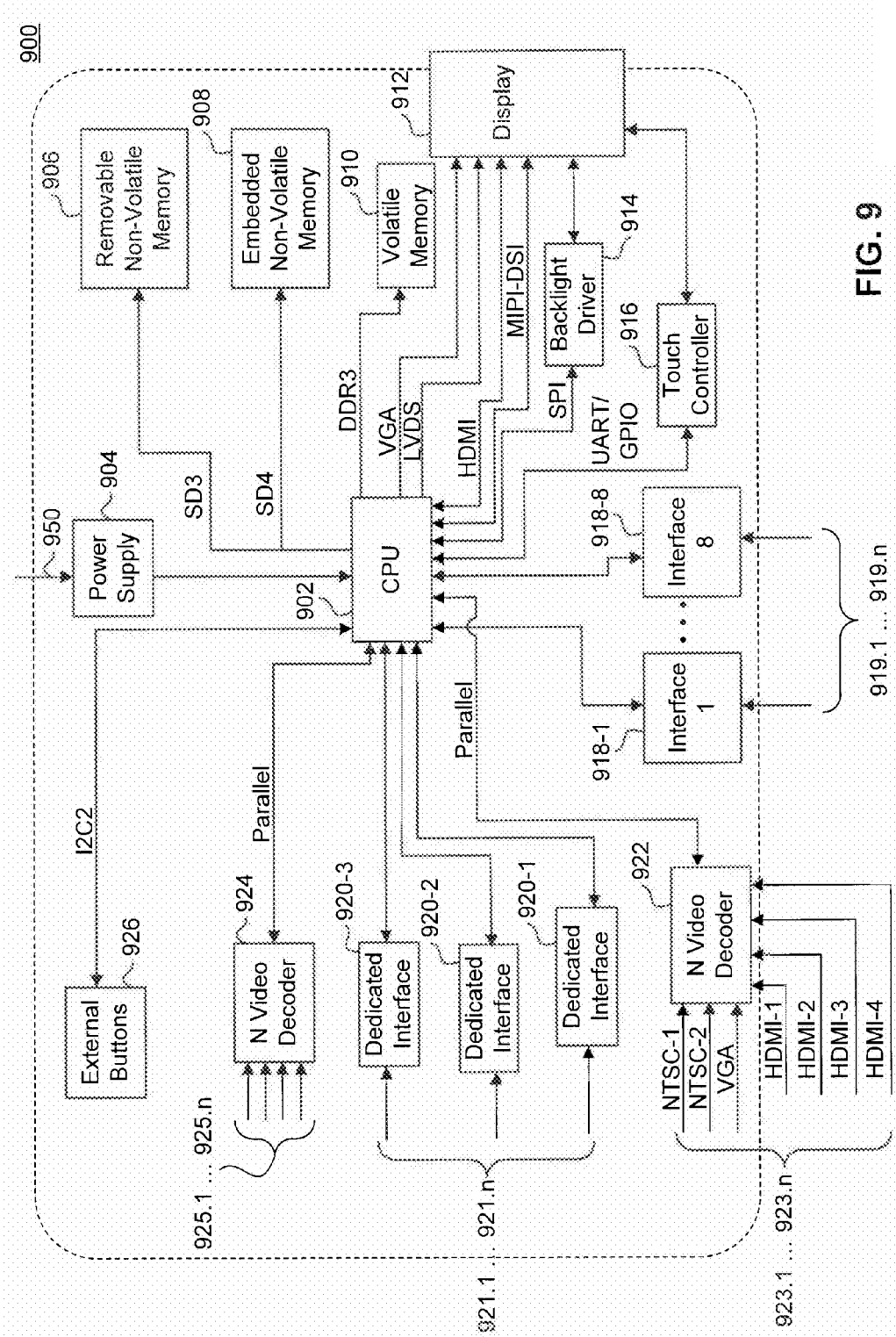
FIG. 9 is a diagram illustrating a modular device in a reconfigurable data distribution system, according to an embodiment.

FIG. 9 illustrates a modular device, such as an integrated system 900, according to another embodiment. The integrated system 900 may include a central processing unit (CPU) host 902, a power supply 904, removable non-volatile memory 906, embedded non-volatile memory 908, volatile memory 910, a display 912, a backlight driver 914, a touch controller 916, a plurality of interfaces 918-1 through 918-8, dedicated interfaces 920-1 through 920-3, an n video decoder 922, another n video decoder 924, and external buttons 926, according to an embodiment. Further, the integrated system 900 includes inputs 919.1 through 919.*n*, inputs 921.1 through 921.*n*, inputs 923.1 through 923.*n*, and inputs 925.1 through 925.*n*, according to an embodiment. Sensors 704.1 through 704.*n* in FIG. 7 may connect to the different inputs of the integrated system 900, according to an embodiment. As will be recognized by those skilled in the relevant art(s), embodiments here are described with the aid of functional building blocks illustrating the implementation of specified functions and relationships thereof. The boundaries of these functional building blocks have been arbitrarily defined for the convenience of the description. Alternate boundaries can be defined so long as the specified functions and relationships are appropriately performed.

The CPU host 902 may be responsible for attaching, managing, receiving, processing, and routing the various peripheral data in integrated system 900, according to an embodiment. The CPU host 902 may perform similar functions to the dedicated microprocessor 210, according to an embodiment. Further, CPU host 902 may perform similar functions to the CPU host 212, according to an embodiment. In an alternative embodiment, integrated system 900 may include a separate microprocessor, not shown in FIG. 9, to perform functions similar to functions performed by CPU host 902 and dedicated microprocessor 210 and separate functions. The separate functions include but are not limited to graphics processing, networking processing, and audio processing, according to an embodiment.

The CPU host 902 may be based on a Reduced Instruction Set Computing (RISC) processor architecture. An example of a RISC processor architecture is an Acorn RISC Machine (ARM) processor architecture. An ARM-based processor may be implemented according to the motherboard standards in the COM Express specification, according to an embodiment.

Generally, an ARM-based processor requires fewer transistors compared to an x86 or a MIPS-based processor. Therefore, an ARM-based processor may produce less heat and use less power compared to an x86 or a MIPS-based processor.

These advantages may enable an ARM-based processor to be used in environments that have relatively stringent power requirements, according to an embodiment. In another embodiment, an ARM-based processor may be used in low-power applications to maintain a low thermal footprint. For example, integrated system 900 may be included in a vehicle such as motorcycle 702, or any other surface, air, or water vehicle, according to example embodiments. In an embodiment, an ARM processor used in such applications may require 5 watts of power or less, whereas an x86 processor may require at least 40 watts of power. Since a motorcycle is typically unable to provide 40 watts of power to a processor without draining its battery's voltage and current, an ARM-based processor provides a suitable advantage over an x86-based processor.

The power supply 904 may supply the power requirements to the different components of integrated system 900, according to an embodiment. Like power supply 208, power supply 904 may receive power input 950, for example from a vehicle battery provided in all vehicles. Further, power supply 904 may be able to continuously operate over a range of voltage input values, similar to power supply 208.

Integrated system 900 may include multiple dedicated memory components, according to an embodiment. The dedicated memory components may include removable non-volatile memory 906, embedded non-volatile memory 908, and volatile memory 910. Examples of removable non-volatile memory 906 may include security digital (SD) cards and Universal Serial Bus (USB) flash drives. An example of embedded non-volatile memory 908 may include an embedded Multi-Media Controller (eMMC) device. An example of volatile memory may include a random access memory (RAM) device.

The communication bus between the CPU host 902 and removable non-volatile memory 906 may communicate using different protocols, according to an embodiment. In an example embodiment, the removable non-volatile memory 906 may communicate with CPU host 902 using a secure digital (SD) protocol such as SD3.0 or SD4.0. In another embodiment, the removable non-volatile memory 906 may communicate with CPU host 902 using serial peripheral interface (SPI) protocols. As will be appreciated by persons skilled in the relevant art(s), the non-volatile memory 906 may alternate between the SD and the SPI communication protocols.

The communication bus between the CPU host 902 and embedded non-volatile memory 908 may communicate over a bidirectional bus, according to an embodiment. In an example embodiment, the embedded non-volatile memory 908 may communicate using SD3.0, SD4.0, or SPI communication protocols.

The communication bus between the CPU host 902 and the RAM 910 may communicate over high bandwidth interfaces. As will be appreciated by persons skilled in the relevant art(s), the CPU host 902 and the RAM 910 may communicate over double data rate type three synchronous dynamic random-access memory (DDR3 SDRAM) or DDR2 SDRAM, according to example embodiments.

Display 912 encompasses similar aspects to display 706. In addition, the display 912 may be used to display the data in any of a plurality of formats, according to an embodiment. For example, display 912 may receive at least high-definition multimedia interface (HDMI) inputs, one video graphics array (VGA) input, and two low-voltage differential signaling (LVDS) inputs to display, according to example embodiments. Further, display 912 may include an interface to connect to an external camera utilizing a particular communication protocol, according to an embodiment. In an example embodiment, display 912 may provide a Mobile Industry Interface (MIPI) Alliance connection such as a display serial interface (DSI). The DSI may define a serial bus and a communication protocol to allow for displaying the data from the external camera on display 912 in real time. Further, FIGS. 8A-8C depict examples of screenshots displayed by display 912.

Backlight driver 914 may be used to adjust the brightness of display 912, according to an embodiment. The backlight driver 914 may include the ability to alter brightness and alter the contrast/saturation of display 912, according to example embodiments. The backlight driver 914 may include an ability to switch from daytime compatibility mode to night time compatibility mode, based on sensing the amount of light received by the display, according to an embodiment. Daytime compatibility mode dims the amount of light displayed by display 912, according to an embodiment. Alternatively, night time compatibility mode increases the amount of light displayed by display 912, according to an embodiment.

Accordingly, a user may alter the brightness and contrast of display 912 by interacting with external buttons 926, according to an example embodiment. The communications from external buttons 926 may pass through CPU host 902 and to the backlight driver 914 by way of an SPI bus, according to an example embodiment. In an example embodiment, as a person skilled in the art would recognize, the CPU host 902 may vary the amount of current transmitted to the backlight driver 914 based on a user's interaction with external buttons 926. The amount of current transmitted to the various LEDs in the backlight driver 914 may vary the LEDs' brightness from 0 nit to 1000 nit, according to an example embodiment.

Touch controller 916 may be used to interact with the touch screen of display 912, according to an embodiment. As mentioned above, display 912 may be any combination of capacitive, resistive, tactile touch screens, or other touch screen technology, according to an embodiment. The touch controller 916 creates an electrical charge in response to a user pressing on a particular point or region on display 912, according to an embodiment. The electrical charge is then transmitted to CPU host 902 for processing, according to an embodiment. The touch controller 916 may communicate with the CPU host 902 over a universal asynchronous receiver/transmitter (UART) bus or a general-purpose input/output (GPIO) bus, according to example embodiments. Communications between the touch controller 916 and the CPU host 902 may be simplex, half duplex, or full duplex, according to example embodiments.

Interfaces 918-1 through interface 918-8 are similar to interfaces 216 through 218 as described above. Similarly, inputs 919.1 through 919.n into interface 918-1 through interface 918-8 are similar to inputs 102.1 through 102.n. Further, these inputs connect to external sensors, such as sensors 704.1 through 704.n, according to an embodiment.

Dedicated interfaces 920-1 through 920-3 are similar to dedicated interface 214. Inputs 921.1 through 921.n are similar to inputs 102.1 through 102.n. Specifically, dedicated interfaces 920-1 through 920-3 may include a controller area network (CAN) bus-based device, as mentioned above. Further, dedicated interfaces 920-1 through 920-3 may also include an Ethernet interface, an audio interface, or a MIPI Camera Serial Interface (CSI) with an external camera device, according to example embodiments. The Ethernet interface may support various speeds ranging from 10 MB/s to 1000 MB/s. Specifically, the Ethernet interface may communicate with the CPU host 902 over a reduced gigabit media-independent interface (RGMII) which communicates an interface between the mac and physical layer, according to an embodiment. The audio interface may include an auxiliary input, an HDMI input, or an RCA input, to name a few examples. The MIPI CSI may support various external camera devices connected to a dedicated interface port to stream real time video, according to an example embodiment.

The n video decoder 922 may be any type of video processor capable of receiving up to n analog video inputs and converting the analog video inputs to digital video components through digitization, according to an embodiment. Further, the n video decoder 922 may be able to simultaneously receive up to n digital video inputs, according to an embodiment. In an embodiment, the n video decoder 922 may act as a multiplexer and pass a selected video input to an output based on a selection signal. N video decoder 924 is another n video decoder similar to n video decoder 922, according to an embodiment. The inputs 925.1 through 925.n are similar to 923.1 through 923.n but are not limited to a particular amount.

In an embodiment, the n video encoder 922 may be able to receive 4 HDMI inputs, 2 NTSC inputs, and 1 VGA input (923.1 through 923.n) for processing. Further, the n video decoder 922 may be able to detect and process the various analog formats including but not limited to HDMI, NTSC, VGA, and PAL. Examples of n video decoders may be an ADV7604 chip or a TVP5146 chip. The video decoder 922 may communicate with the CPU host 902 over PCI or PCIe-based communication, according to an embodiment.

The n video decoder 922 may also receive a control signal from CPU host 902 to select one of the video inputs, according to an embodiment. In an embodiment, the selection of one of the video inputs by the control signal signifies to the n video decoder 922 which one of the video inputs to route to the CPU host 902.

In an embodiment, n video decoder 922 may pass the frame resolution information of the video input based on the signal selection. The frame resolution information may include a frame height, a frame width, and a refresh rate, according to an embodiment. For example, the frame resolution information may be passed in a data structure such as an extended display identification data (EDID) structure. Further, the n video decoder 922 may pass the type of the video input to the CPU host 902 for further processing specific to that type of detected input, according to an embodiment. The type of video input may also be passed in the EDID structure, according to an embodiment.

External buttons 926 may be any type of button used to communicate with the display 912, according to an embodiment. The external buttons 926 may be used to select different functions displayed by display 912, according to an embodiment. The functions of external buttons 926 may result similarly to a user pressing on the display 912 for similar functions, according to an example embodiment. The external buttons 926 may communicate with CPU host 902 over a bi-directional serial bus such as an I2C (Inter-IC) bus, according to an example.

The external buttons 926 may be any button located on the display 912, according to an embodiment. In addition, the external buttons 926 may also be located external to display 912, such as located on the handle bars of motorcycle 702, or located on a steering wheel of a vehicle, according to example embodiments.

Figure 10:
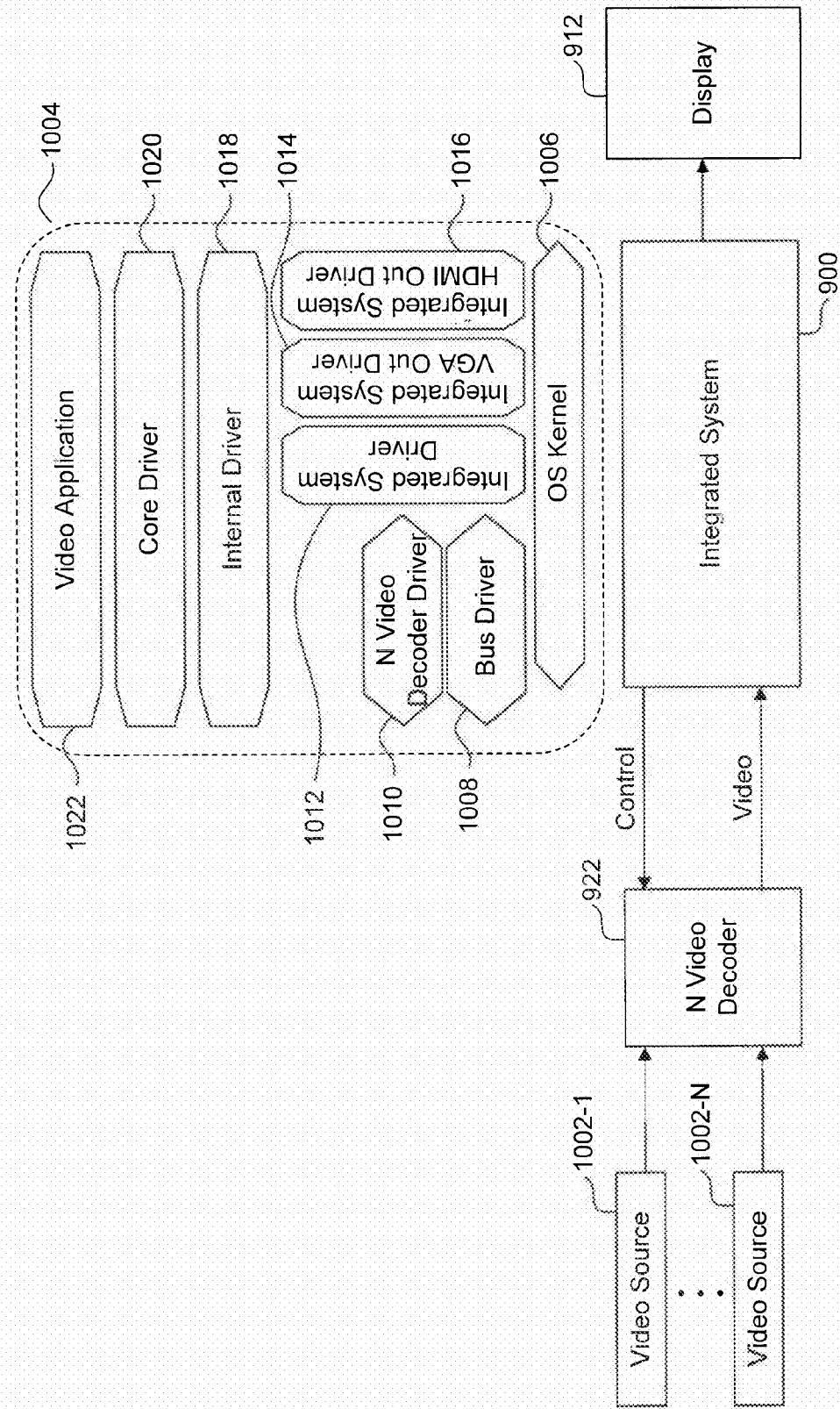
FIG. 10 illustrates an application of a modular device in a reconfigurable data distribution system, according to an embodiment.

FIG. 10 illustrates an application of integrated system 900, according to an embodiment. Specifically, FIG. 10 illustrates software and hardware components required to route a video source 1002-1 through 1002-N to display 912. FIG. 10 includes video source 1002-1 through 1002-N connected to an n video decoder 922. The n video decoder 922 is connected to the integrated system 900, according to an embodiment. In one embodiment, the n video decoder 922 may be connected directly to the integrated system 900. In an alternative embodiment, the n video decoder 922 may be placed on a daughter board which is connected to the integrated system 900.

In an embodiment, software driver 1004 illustrates an open systems interconnection (OSI) model for integrated system 900. According to an embodiment, a software driver 1004 may be defined for each individual input on the integrated system 900. Explained below is an example of a software driver 1004 with a video source 1002-N as an input.

Starting at the lowest level, software driver 1004 includes an operating system (OS) kernel 1006 required to communicate with the specific hardware and software components internal and external to the integrated system 900, according to an embodiment. The OS kernel 1006 may be linux or windows based, according to example embodiments. The software driver 1004 includes a bus driver 1008 used to communicate with an internal or external device to the integrated system 900. In an example embodiment, bus driver 1008 may by an Inter IC (I2C) bus driver, in which one or more master/slave relationships exist between integrated system 900 and any number of internal or external devices. The software driver 1004 also includes an n video decoder driver 1010, according to an embodiment. The n video decoder driver 1010 is used as the primary driver to configure and monitor the status of the n video decoder 922, according to an embodiment. Further features of the n video decoder driver 1010 will be explained below.

The software driver 1004 includes an integrated system driver 1012, according to an embodiment. The integrated system driver 1012 may include drivers specifically provided by the CPU host 902. For example, the ARM processor of CPU host 902 may provide specific drivers and functions related to the inputs such as audio, video capture, CAN bus-based, Ethernet, storage, and video display, to name a few. In an embodiment, the integrated system driver 1012 may be called based on the function required to process that input. In one example, if the input to the CPU host 902 is a video source, then an integrated system capture driver may be called from the ARM processor to read in and capture the video data in a buffer for displaying.

The software driver 1004 further includes two output drivers: integrated system VGA out driver 1014 and integrated system HDMI out driver 1016, according to embodiments. The integrated system VGA out driver 1014 outputs the video data based on the VGA input into the n video decoder 922, according to an embodiment. Similarly, the integrated system HDMI out driver 1016 outputs the video data based on the HDMI input into the n video decoder 922, according to an embodiment. Based on the required frame resolution, e.g.—frame width and frame height, these two out drivers allocate in memory a size for a desired resolution to display to display 912, according to an embodiment. The allocated memory reserves a buffer for transmitting the video frame with a desired video resolution to display 912, according to an embodiment. Further, the two out drivers may be used to ensure the captured video input has the desired video resolution, according to an embodiment. If the captured video input does not have the desired video resolution, then the integrated system VGA out driver 1014 or the integrated system HDMI out driver 1016 may reprocesses the captured video input to have the desired video resolution based on the video input type, according to an embodiment.

The software driver 1004 also includes an internal driver 1018, according to embodiment. The internal driver 1018 may be used as a gateway to communicate with the n video decoder driver 1010 and the n video decoder 922, according to an embodiment. Specifically, the internal driver 1018 may receive input/output control (ioctl) callback function commands to the n video decoder driver 1010, according to an embodiment. The internal driver 1018 may be used to invoke the ioctl callback function commands with the n video decoder 922, according to an embodiment. For example, the internal driver 1018 may use the ioctl callback functions to determine and process the status and configuration of n video decoder 922. In another example, the internal driver 1018 may set parameters associated with the n video decoder 922.

The core driver 1020 is further included in the software driver 1004, according to an embodiment. The core driver 1020 may be used as a gateway to communicate with the internal driver 1018 and video application 1022, according to an embodiment. The core driver 1020 may be used to convert video application 1022's response to touch screen presses and/or button presses of display 912 into functional commands understood by the internal driver 1018, according to an embodiment. According to an example embodiment, a user may interact with the touch screen display 912 or external buttons 926 to select a particular function on the display 912. The selection of a particular function may generate a particular response in the video application 1022 layer denoting a location on the display 912's screen in which a user selected the function, according to an embodiment. The core driver 1020 may be used to convert the selected location to a function understood by the internal driver 1018 to perform the function based on the selected location, according to an embodiment. For example, routing a different video source 1002-N to display 912. The core driver 1020 and internal driver 1018 may use an application language such as G-streamer or ffmpeg to support the handling of audio/video streaming and the processing of complex audio and video segments, according to example embodiments.

Figure 11:
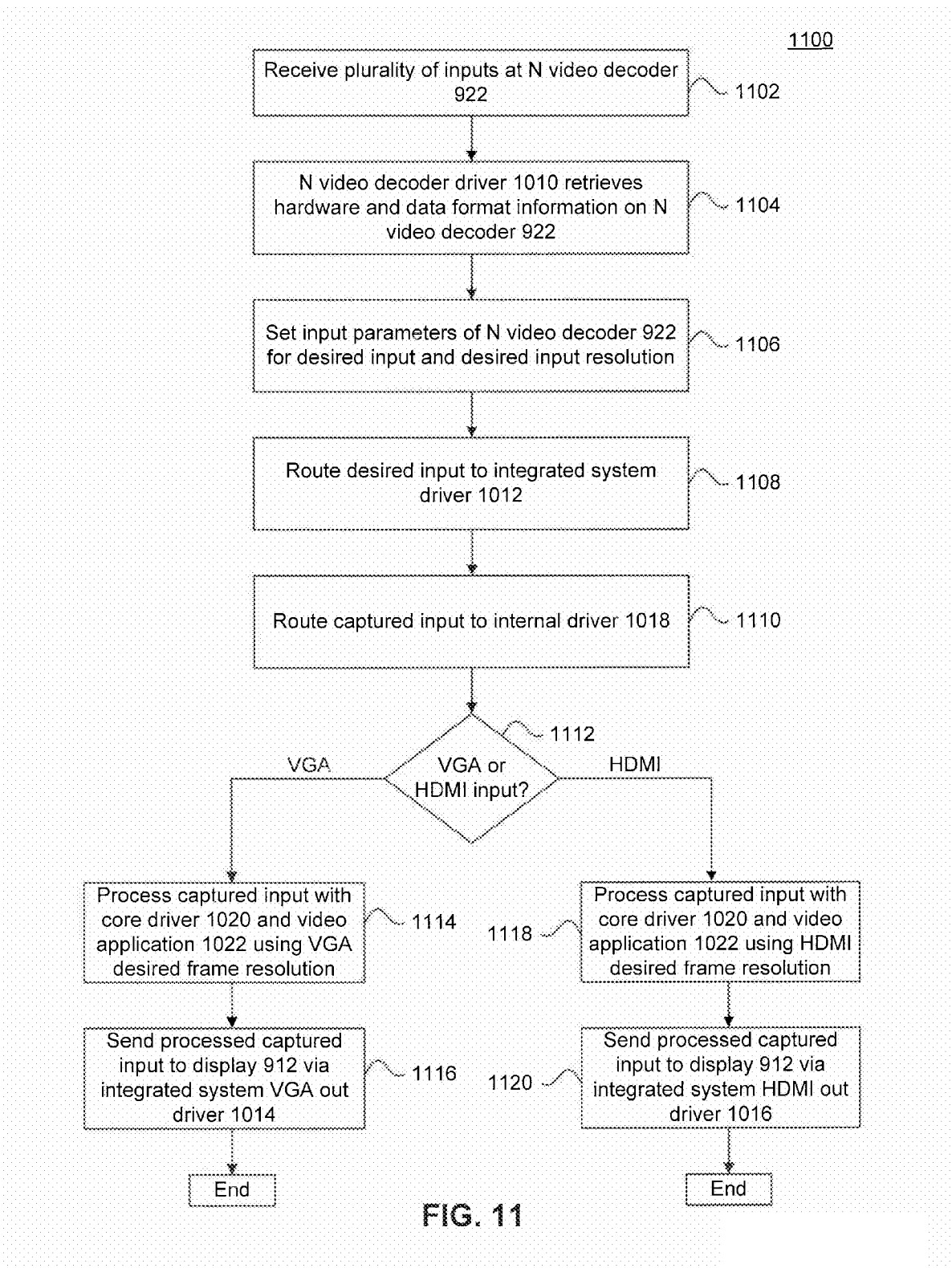
FIG. 11 is a flowchart illustrating a distribution of data flow of a modular device, according to an embodiment.

FIG. 11 illustrates a distribution of data flow of integrated system 900, according to an embodiment.

At step 1102, the integrated system 900 may receive a plurality of inputs at the n video decoder 922. For example, the plurality of inputs may be inputs 923.1 through 923.*n* that are connected to the n video decoder 922. The sensors 704.1 through 704.*n* may connect to inputs 923.1 through 923.*n*.

At step 1104, the n video decoder driver 1010 may retrieve hardware and data format information from the n video decoder 922, according to an embodiment. Specifically, the n video decoder driver 1010 retrieves hardware information relating to the n video decoder 922's interface—such as the device's address and a number of parameters needed to communicate with the n video decoder 922. In an embodiment, the n video decoder driver 1010 retrieves data format information relating to the clock speed required to communicate with the n video decoder 922 and the different input types. The different input types are used to create different buffers for reading in specific inputs, such as video types VGA or HDMI, according to an example embodiment. The n video decoder driver 1010 may pass the hardware and data format information to the internal driver 1018 via ioctl callback functions, according to an embodiment.

At step 1106, the integrated system 900 may set input parameters of n video decoder 922 for a desired input and a desired input resolution, according to an embodiment. The internal driver 1018 may use the ioctl callback function to set the desired input and the desired input resolution, according to an embodiment. Specifically, the internal driver 1018 configures the n video decoder 922 to select a desired input by passing an input parameter in the ioctl callback function to the n video decoder 922, according to an embodiment. For example, the parameter in the ioctl callback function commands the n video decoder 922 to select a VGA channel and/or one of the HDMI channel. Similarly, a separate parameter is used in the ioctl callback function to select the n video decoder 922's input resolution. For example, the input resolution ranges from 640 to 1920 pixels by 480 to 1200 pixels. Further, the frame rate may range from 60 Hertz (Hz) to 85 Hz.

At step 1108, the integrated system 900 may route the desired input with the desired input resolution to CPU host 902's specified function for processing the input, according to an embodiment. Specifically, the desired input and desired input resolution are routed to the integrated system driver 1012, according to an embodiment. For example, the desired input and desired input resolution may be routed in an EDID structure. At the integrated system driver 1012, a buffer is created in memory based on the input type—where the input type may be a video of type, HDMI or VGA, to capture the input data, according to an embodiment.

At step 1110, the integrated system 900 may route the captured input data from the integrated system driver 1012 to the internal driver 1018, according to an embodiment. The internal driver 1018 receives the captured input data from the integrated system driver 1012 and at step 1112, the internal driver 1018 determines if the captured input data is of type VGA or HDMI. Specifically, the internal driver 1018 determines if the captured input data is VGA or HDMI based on the parameter passed by the internal driver 1018 using the ioctl callback function, according to an embodiment. In an alternative embodiment, the internal driver 1018 may read the EDID to determine the type of captured input data.

If the internal driver 1018 decides the input to be VGA at step 1112, then at step 1114, the captured input data is processed based on the desired input resolution using the core driver 1020 and the video application 1022, according to an embodiment. The core driver 1020 scans removable non-volatile memory 906, embedded non-volatile memory 908, and volatile memory 910 and retrieves any captured input capable of processing, according to an embodiment. The video application 1022 receives the retrieved captured input data from the core driver 1020 and processes the captured input data to have the desired input resolution, according to an embodiment. For example, the video application 1022 may use specific function calls of the G-streamer or ffmpeg application to process the captured input with the desired input resolution.

At step 1116, the newly processed captured input data with the desired input resolution is sent to the integrated VGA out driver 1014, according to an embodiment. The integrated system VGA out driver 1014 prepares the captured input data to be transmitted to display 912 via a VGA link and ensures the captured input data's processed resolution meets the desired input resolution for VGA, according to an embodiment. If the resolution condition is met, the captured input data is sent to display 912 via the VGA link. If the resolution condition is not met, the integrated VGA out driver 1014 reprocesses the captured input data to have the desired input resolution. In an embodiment, the integrated VGA out driver 1014 may call the g-streamer or ffmpeg application to reprocess the captured input data with the desired input resolution. Afterwards, the integrated VGA out driver 1014 sends the captured input data to display 912 via the VGA link.

If the internal driver 1018 decides the input to be HDMI at step 1112, then at step 1118, the captured input data is processed based on the desired input resolution using the core driver 1020 and the video application 1022, according to an embodiment. Similar to step 1114, at step 1118, the core driver 1020 scans and retrieves any captured input data from removable non-volatile memory 906, embedded non-volatile memory 908, and volatile memory 910 and video application 1022 processes the captured input data to have the desired input resolution, according to an embodiment.

Step 1120 is similar to step 1116. The difference at step 1120 is integrated system HDMI out driver 1016 is used to prepare the captured input data to be transmitted to display 912 via an HDMI link and ensures the captured input data's processed resolution meets the HDMI input, according to an embodiment. If the HDMI resolution condition is met, the captured input data is sent to display 912 via an HDMI link. Otherwise, the integrated system HDMI out driver 1016 reprocesses the captured input data to have the desired input resolution. In a similar embodiment, the integrated system HDMI out driver 1016 may call the g-streamer or ffmpeg application to reprocess the captured input data with the desired input resolution. Then, the integrated HDMI out driver 1016 transmits the captured input data to display 912 via HDML.

Figure 12:
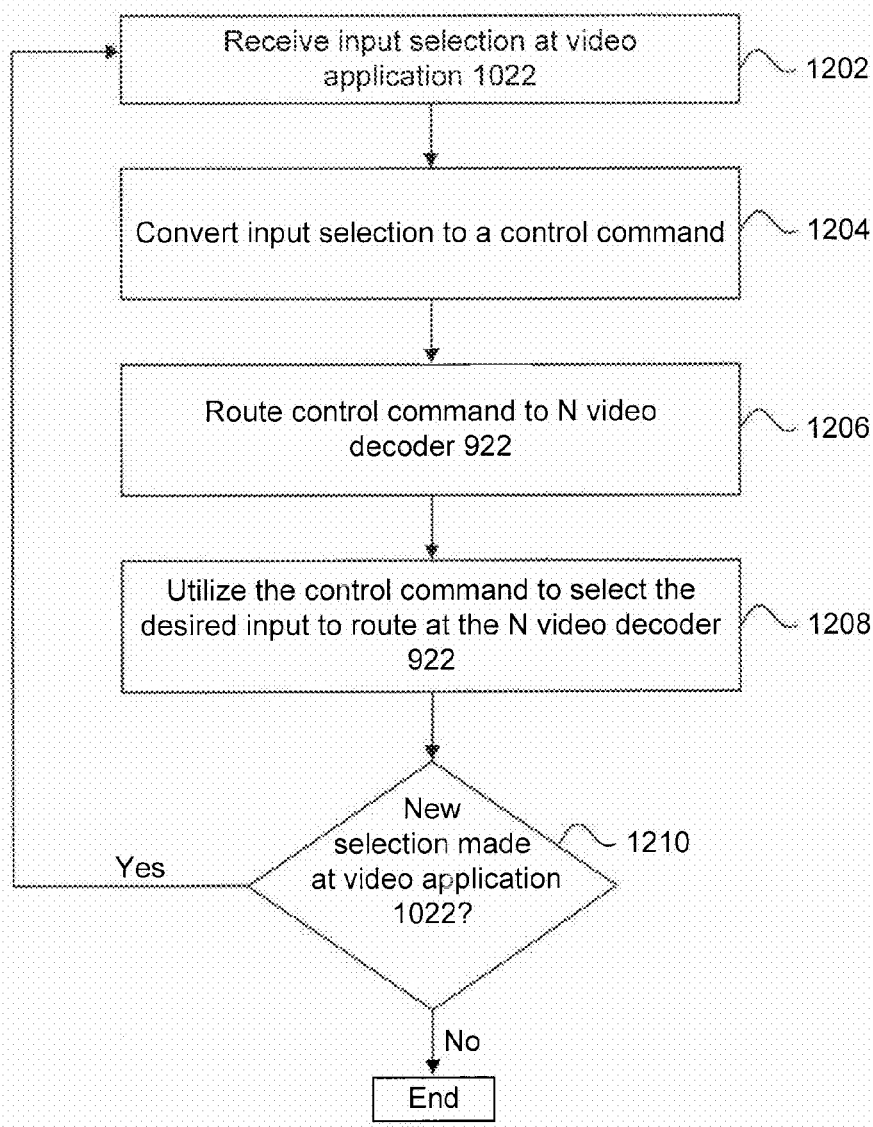
FIG. 12 is a flowchart illustrating a distribution of control flow of a modular device, according to an embodiment.
Figure 13:
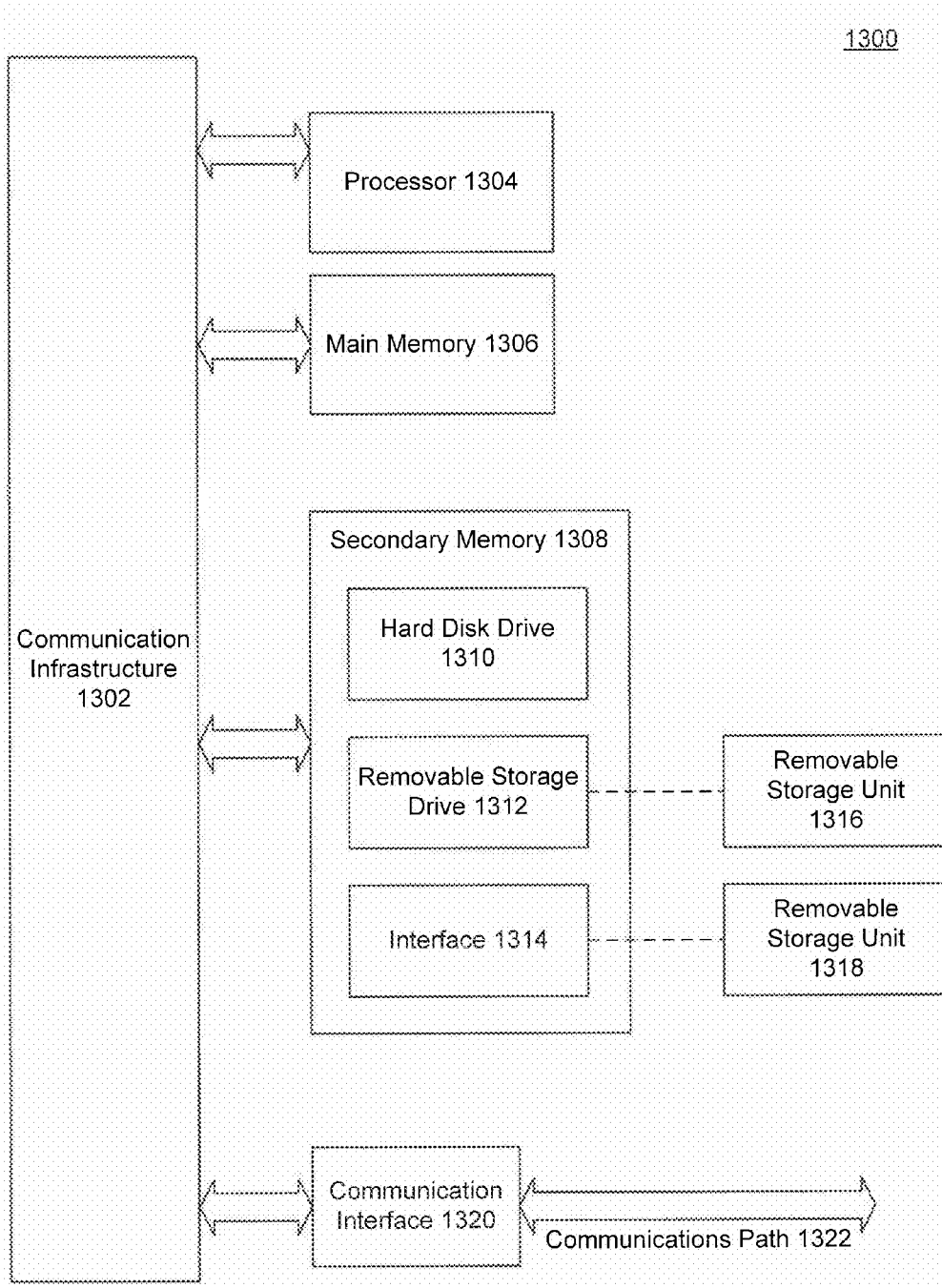
FIG. 13 is an example computer system useful for implementing various embodiments.

FIG. 12 illustrates a distribution of control flow of integrated system 900, according to an embodiment.

At step 1202, the integrated system 900 receives an input selection at video application 1022 via display 922, according to an embodiment. In an example embodiment, a user may interact with touch screen of display 912 or external buttons 926 to select a particular function on the display 912.

At step 1204, the input selection of a particular function may generate a particular response in the video application 1022 layer denoting a location in which a user selected the function, according to an embodiment. The core driver 1020 may be used to convert the location denoting a function into a particular control command, according to an embodiment. Any language as pertains to one skilled in the art, such as g-streamer, python, or C++ to name a few, may be used to convert the location command to a particular control command, according to embodiments. For example, the particular control command may be an I2C (Inter IC) command or a message string with components describing the functional aspect of the command.

At step 1206, the control command is routed from the internal driver 1018 to the n video decoder 922, according to an embodiment. The core driver 1020 passes the control command through the internal driver 1018 and to the n video decoder driver 1010, according to an embodiment. The n video decoder driver 1010 formats the control command based on the address format of the n video decoder 922, according to an embodiment. Once the control command is formatted, the n video decoder driver 1010 transmits the control command over the bus driver 1008 to the n video decoder 922, according to an embodiment.

At step 1208, the control command is used to select the desired input at the n video decoder 922 to route, according to an embodiment. The control command instructs the n video decoder 922 to route the desired input based on a parameter in the control command, according to an embodiment.

At step 1210, the integrated system 900 checks to see if a user selected a new function at display 912 that has yet to be processed, according to an embodiment. If the user has not selected a new function at display 912, then the process ends. Alternatively, if the user has selected a new function at display 912, the process starts over at 1202.

Exemplary Computer System

Embodiments of the present disclosure can be implemented in hardware, software or as a combination of software and hardware. Consequently, embodiments of the disclosure may be implemented in the environment of a computer system or other processing system. An example of such a computer system 900 is shown in FIG. 9. Embodiments described in the previous figures, for example the integrated system 104 in FIGS. 1-4, may execute on one or more computer systems 900. Furthermore, each of the steps of the processes depicted in FIGS. 5 and 6 can be implemented on one or more computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, flash memory, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCMCIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 700. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A reconfigurable data distribution system coupled to a motorcycle, comprising:
    an integrated information distribution apparatus, wherein the integrated information distribution apparatus comprises:
        a power supply;
        an integrated controller configured to host a plurality of sensors and a display;
        a video decoder configured to receive one or more inputs and route a selected input based on an interaction with the display, wherein the display comprises one or more display partitions, wherein the display is configured to enable adjusting sizes of the display partitions, route the selected input to one of the display partitions, and present the display partitions on the display in an adjacent manner, wherein the inputs include brake manifold components, speed sensors, battery voltage sensors, gas sensors, and data associated with an engine of the motorcycle;
        memory devices configured to store the selected input;
        an open systems interconnection (OSI) module for each of the inputs controlling the integrated information distribution apparatus, wherein the OSI module comprises one or more of:
            a video decoder module configured to retrieve information relating to an interface of the video decoder and monitor a status of the video decoder, wherein the information comprises an address of the video decoder and one or more parameters associated with the video decoder;
an integrated system module configured to retrieve and execute a function from a processor related to the inputs;
an integrated system VGA out module configured to output the selected input to the display via a VGA connection based on an input VGA connection of the selected input to the video decoder and reprocess a current resolution of the selected input when the current resolution does not meet or exceed a desired VGA output resolution;
an integrated system HDMI out module configured to output the selected input to the display via an HDMI connection based on an input HDMI connection of the selected input to the video decoder and reprocess the current resolution of the selected input when the current resolution does not meet or exceed a desired HDMI output resolution; and
an internal module configured to receive input/output control commands from the video decoder module, set the one or more parameters associated with the video decoder, determine a type of the selected input based on the one or more parameters associated with the video decoder, set the desired VGA output resolution and the desired HDMI output resolution based on the type of the selected input, and convert a function received by a core module to the input/output control command.

2. The reconfigurable data distribution system of claim 1, wherein the memory devices include removable non-volatile memory, embedded non-volatile memory, and volatile memory.

3. The reconfigurable data distribution system of claim 1, wherein the interaction with the display results in a signal signifying location.

4. The reconfigurable data distribution system of claim 3, wherein the signal signifying location is converted to a control signal.

5. The reconfigurable data distribution system of claim 4, wherein the control signal selects an input from the video decoder.

6. The reconfigurable data distribution system of claim 1, wherein the selected input is processed to have a desired input resolution.

7. A method for reconfigurable data distribution coupled to a motorcycle, comprising:
hosting a plurality of sensors and a display;
attaching and managing the plurality of sensors;
controlling each of the sensors with an associated open systems interconnection (OSI) module;
receiving a location signal from the display based on an interaction with the display;
converting the location signal to a control signal; and
routing selected inputs from the sensors to the display based on the control signal, wherein the display comprises one or more display partitions, wherein the display is configured to enable adjusting sizes of the display partitions, route the selected inputs to one of the display partitions, and present the display partitions on the display in an adjacent manner, wherein the sensors include brake manifold components, speed sensors, battery voltage sensors, gas sensors, and data associated with an engine of the motorcycle,
wherein the OSI module is further configured to:
retrieve information relating to an interface of a video decoder and monitor a status of the video decoder, wherein the information comprises an address of the video decoder and one or more parameters associated with the video decoder;
retrieve and execute a function from a processor related to the sensors;
output the selected inputs to the display via a VGA connection based on an input VGA connection of the selected inputs to the video decoder and reprocess a current resolution of the selected inputs when the current resolution does not meet or exceed a desired VGA output resolution;
output the selected inputs to the display via an HDMI connection based on an input HDMI connection of the selected inputs to the video decoder and reprocess the current resolution of the selected inputs when the current resolution does not meet or exceed a desired HDMI output resolution; and
receive input/output control commands from a video decoder module, set the one or more parameters associated with the video decoder, determine a type of the selected input based on the one or more parameters associated with the video decoder, set the desired VGA output resolution and the desired HDMI output resolution based on the type of the selected inputs, and convert a function received by a core module to the input/output control commands.

8. The method for reconfigurable data distribution of claim 7, wherein the selected inputs comprise a subset of the sensors.

9. The method for reconfigurable data distribution of claim 7, further comprising retrieving hardware and data format information of one of the sensors.

10. The method for reconfigurable data distribution of claim 7, further comprising processing a selected input to have a desired input resolution.

11. A non-transitory tangible computer-readable device having instructions stored thereon that, when executed by at least one computing device, causes at least one computing device coupled to a motorcycle to perform operations comprising:
hosting a plurality of sensors and a display;
attaching and managing the plurality of sensors;
controlling each of the sensors with an associated open systems interconnection (OSI) module;
receiving a location signal from the display based on an interaction with the display;
converting the location signal to a control signal; and
routing selected inputs from the sensors to the display based on the control signal, wherein the display comprises one or more display partitions, wherein the display is configured to enable adjusting sizes of the display partitions, route the selected inputs to one of the display partitions, and present the display partitions on the display in an adjacent manner, wherein the sensors include brake manifold components, speed sensors, battery voltage sensors, gas sensors, and data associated with an engine of the motorcycle,
wherein the OSI module causes the computing device to perform operations comprising:
retrieving information relating to an interface of a video decoder and monitor a status of the video decoder, wherein the information comprises an address of the video decoder and one or more parameters associated with the video decoder;

retrieving and execute a function from a processor related to the sensors;

outputting the selected inputs to the display via a VGA connection based on an input VGA connection of the selected inputs to the video decoder and reprocess a current resolution of the selected inputs when the current resolution does not meet or exceed a desired VGA output resolution;

outputting the selected inputs to the display via an HDMI connection based on an input HDMI connection of the selected inputs to the video decoder and reprocess the current resolution of the selected input when the current resolution does not meet or exceed a desired HDMI output resolution; and receiving input/output control commands from a video decoder module, set the one or more parameters associated with the video decoder, determine a type of the selected input based on the one or more parameters associated with the video decoder, set the desired VGA output resolution and the desired HDMI output resolution based on the type of the selected inputs, and convert a function received by a core module to the input/output control command.

12. The non-transitory tangible computer-readable device of claim 11, wherein the selected inputs comprise a subset of the sensors.

13. The non-transitory tangible computer-readable device of claim 11, the operations further comprising retrieving hardware and data format information of one of the plurality of sensors.

14. The non-transitory tangible computer-readable device of claim 11, the operations further comprising processing a selected input to have a desired input resolution.

15. The reconfigurable data distribution system of claim 1, wherein the OSI module further comprises:
a system module configured to create bidirectional communication pathways between the plurality of sensors, the video decoder, the OSI module, and the display;
a bus module configured to create one or more master and slave relationships between the integrated information distribution apparatus and one or more peripheral devices;
the core module configured to convert a response of an interaction with the display to the function understood by the internal module; and
a video module configured to receive the response of the interaction with the display and transmit the response to the core module for processing.

16. The reconfigurable data distribution system of claim 1, wherein the integrated information distribution apparatus further comprises:
external buttons configured to interact with the display;
dedicated interfaces configured to connect peripheral devices to the integrated information distribution apparatus, wherein the dedicated interfaces comprise a controller area network (CAN) bus-based interface, an Ethernet interface, an audio interface, and a Mobile Industry Interface (MIPI) Alliance Camera Serial Interface (CSI) connected to an external camera device;
a touch controller configured to create an electrical charge in response to a press on the display and convert the electrical charge into a requested function;
a backlight module configured to alter a brightness, a contrast, and a saturation of the display based on sensing an amount of light received by the display, switching between a daytime compatibility mode and a nighttime compatibility mode based on a time of day, or interacting with the external buttons.

17. The reconfigurable data distribution system of claim 1, further comprising:
a hardware processor coupled to the memory devices via a bus; and
an integrated system, wherein the integrated system
receives the inputs at the video decoder,
retrieves hardware and data format information associated with the video decoder,
sets input parameters regarding a desired input and a desired input resolution associated with the video decoder,
processes the desired input to meet the desired input resolution; and
routes the processed desired input to the display, wherein the integrated system is implemented using said hardware processor and said memory devices.

18. The reconfigurable data distribution system of claim 1, wherein the one or more parameters associated with the video decoder comprise a clock speed required to communicate with the video decoder and types of the inputs.

19. The reconfigurable data distribution system of claim 1, wherein the OSI module comprises the video decoder module, the integrated system module, the integrated system VGA out module, the integrated system HDMI out module, and the internal module.

* * * * *

UNITED STATES PATENT AND TRADEMARK OFFICE
CERTIFICATE OF CORRECTION

PATENT NO. : 9,563,582 B2  
APPLICATION NO. : 15/015729  
DATED : February 7, 2017  
INVENTOR(S) : Gregory Emil Glaros Page 1 of 1

It is certified that error appears in the above-identified patent and that said Letters Patent is hereby corrected as shown below:

In the Claims

In Column 25, Line 29, replace "one of the plurality" with --one of the--.

Signed and Sealed this
Tenth Day of April, 2018

Andrei Iancu
*Director of the United States Patent and Trademark Office*